(12) United States Patent
Dame

(10) Patent No.: US 9,083,549 B2
(45) Date of Patent: Jul. 14, 2015

(54) AIRCRAFT COMMUNICATION BUS FAULT ISOLATOR APPARATUS

(71) Applicant: The Boeing Company, Chicago, IL (US)

(72) Inventor: Stephen G. Dame, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/321,809

(22) Filed: Jul. 2, 2014

(65) Prior Publication Data

US 2015/0003229 A1 Jan. 1, 2015

Related U.S. Application Data

(62) Division of application No. 13/044,850, filed on Mar. 10, 2011, now Pat. No. 8,797,842.

(51) Int. Cl.
| | |
|---|---|
| *H04L 1/00* | (2006.01) |
| *H04L 12/40* | (2006.01) |
| *H02J 3/00* | (2006.01) |
| *H04L 12/24* | (2006.01) |

(52) U.S. Cl.
CPC ........... *H04L 12/40026* (2013.01); *H02J 3/006* (2013.01); *H04L 12/40* (2013.01); *H04L 12/40045* (2013.01); *H04L 41/0668* (2013.01); *H04L 2012/4028* (2013.01); *Y10T 29/49718* (2015.01)

(58) Field of Classification Search
CPC .................. H04L 2012/4028; H04L 12/40
See application file for complete search history.

(56) References Cited

U.S. PATENT DOCUMENTS

| | | | |
|---|---|---|---|
| 4,590,619 | A | 5/1986 | Winzer |
| 5,012,120 | A | 4/1991 | Minagawa et al. |
| 5,513,369 | A | 4/1996 | Patel et al. |
| 5,694,542 | A | 12/1997 | Kopetz |

(Continued)

FOREIGN PATENT DOCUMENTS

EP 0495575 A1 7/1992

OTHER PUBLICATIONS

Paulitsch et al., "Fault Isolation with Intermediate Checks of End-to-end Checksums in the Time-Triggered System-on-Chip Architecture", Jul. 8, 2009 10 pages.

(Continued)

*Primary Examiner* — Andrew Lai
*Assistant Examiner* — Jamaal Henson
(74) *Attorney, Agent, or Firm* — Yee & Associates, P.C.

(57) ABSTRACT

A structure and a first panel are operably disposed with respect to the structure. A first plurality of nodes is disposed within the first panel, including a first plurality of power distribution network nodes in a first power distribution network, and wherein the first plurality of nodes further comprises a first group of nodes. A second panel is operably disposed with respect to the structure. A second plurality of nodes is disposed within the second panel, including a second plurality of power distribution network nodes in a second power distribution network isolated from the first power distribution network. The second plurality of nodes further comprises a second group of nodes. A bus guardian, separate from the two panels, electrically connects the first panel and the second panel. The bus guardian is configured to network the first group of nodes and the second group of nodes in a network.

10 Claims, 11 Drawing Sheets

(56) References Cited

U.S. PATENT DOCUMENTS

| | | | |
|---|---|---|---|
| 5,887,143 | A | 3/1999 | Saito et al. |
| 7,542,412 | B2 | 6/2009 | Rausch et al. |
| 7,839,868 | B2 | 11/2010 | Kopetz |
| 8,797,842 | B2 | 8/2014 | Dame |
| 2006/0112204 | A1 | 5/2006 | Casteignau |
| 2006/0293805 | A1 | 12/2006 | Garcia |
| 2007/0268819 | A1* | 11/2007 | Johansson et al. ............ 370/216 |
| 2008/0063398 | A1* | 3/2008 | Cline ............................. 398/66 |
| 2009/0093918 | A1 | 4/2009 | Shrimpling |
| 2009/0279540 | A1 | 11/2009 | Van Wageningen |
| 2009/0304052 | A1 | 12/2009 | Lassini et al. |
| 2010/0195634 | A1 | 8/2010 | Thompson |
| 2012/0011403 | A1 | 1/2012 | Bock et al. |
| 2012/0230181 | A1 | 9/2012 | Dame |

OTHER PUBLICATIONS

Ademaj et al., "Fault-Tolerant Time-Triggered Ethernet Configuration with Star Topology", Part of the 19th International Conference on Architecture of Computing Systems (ARCS '06), Mar. 2006, 10 pages.

"The MARS Project", Vienna University of Technology, 1 page, retrieved Jan. 17, 2011.

Obermaisser et al., "A Router for Improved Fault Isolation, Scalability and Diagnosis in CAN", Jul. 13-16, 2010, 4 pages.

"Real-Time Systems: Design Principles for Distributed Embedded Applications", The Springer International Series in Engineering and Computer Science, Apr. 1, 1997, 352 pages.

GB search report dated Jul. 6, 2012 regarding application GB1204076.2, applicant The Boeing Company, applicant reference P53960GB/RGH/CAC, 7 pages.

GB search report dated Jan. 15, 2013 regarding application GB1204076.2, Jan. 15, 2013, applicant The Boeing Company, applicant reference P53960GB/RGH/CAC, 4 pages.

Office action dated Jul. 3, 2013 regarding U.S. Appl. No. 13/044,850, 22 pages.

Final Office action dated Jan. 27, 2014 regarding U.S. Appl. No. 13/044,850, 10 pages.

Notice of Allowance action dated Mar. 21, 2014 regarding U.S. Appl. No. 13/044,850, 12 pages.

GB search report dated Apr. 2, 2014 regarding application GB1204076.2, Apr. 2, 2014, applicant The Boeing Company, applicant reference P53960GB/RGH/CAC, 3 pages.

GB search report dated Feb. 18, 2015 regarding application GB1204076.2, Feb. 18, 2015, applicant the Boeing Company, applicant reference P53960GB/CBJ, 5 pages.

* cited by examiner

FIG. 12
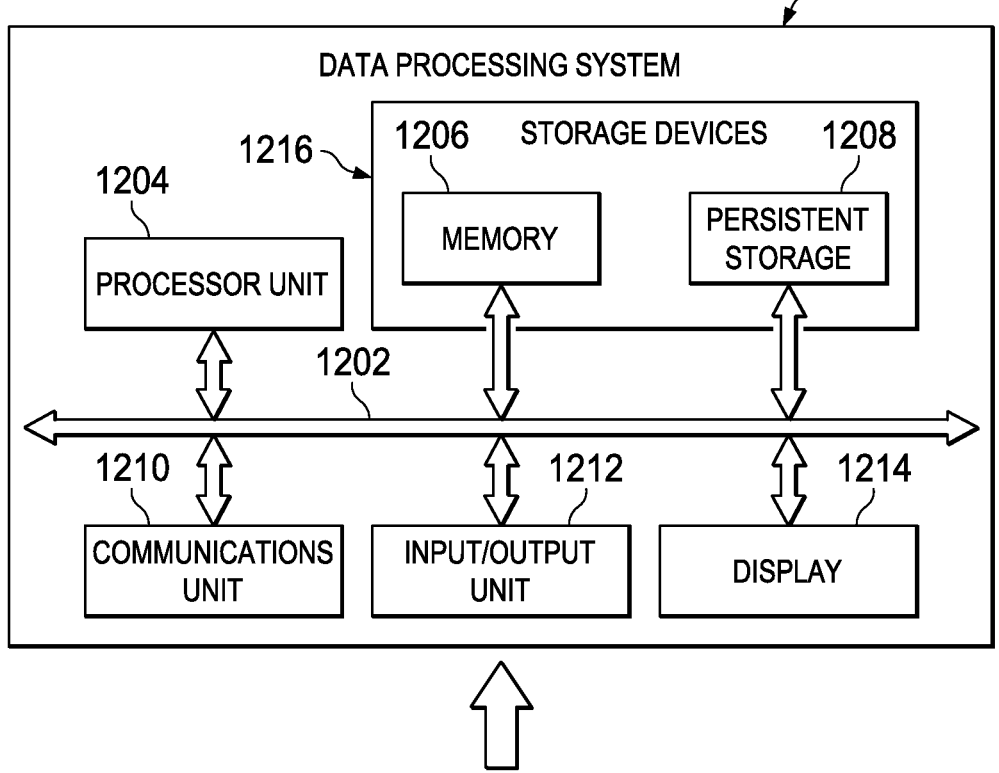
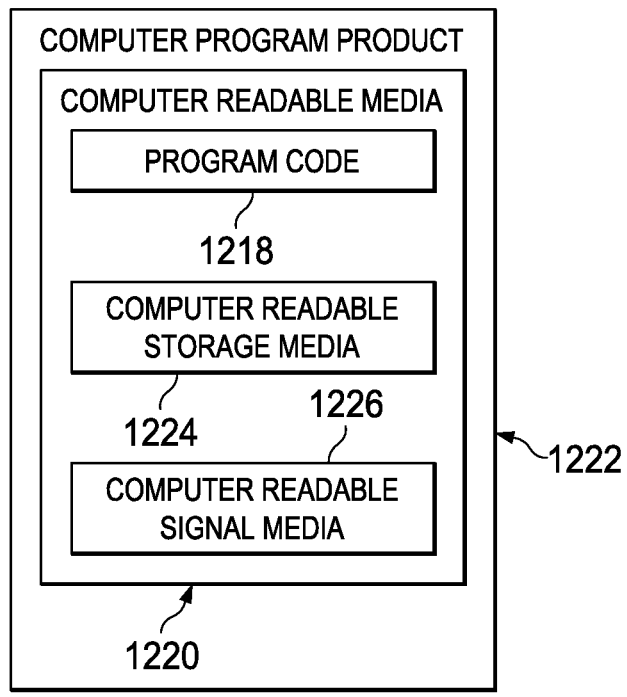

AIRCRAFT COMMUNICATION BUS FAULT ISOLATOR APPARATUS

This application is a divisional application of U.S. application Ser. No. 13/044,850, filed Mar. 10, 2011.

BACKGROUND INFORMATION

1. Field

The present disclosure relates generally to electronics and, in particular, to power systems in aviation electronics.

2. Background

Aircraft may use power distribution networks in order to provide electrical power to many different components used for flight, navigation, cabin comfort, entertainment, instrumentation, and possibly many other functions. An aircraft's power distribution network may include a number of panels connected by one or more buses. The term "panel" refers to a section of an aircraft that contains electronics or other components. A panel may contain components used to either generate or distribute power. Many panels include one or more internal nodes, such as power distribution nodes, that are the hubs used to connect other electrical components within the panel itself. Together, these one or more internal nodes may form a group of nodes for a given panel.

Panels are often disposed on or in the aircraft for maintenance access. The term "panel" by itself does not imply any particular structural shape or architecture. As used herein, the term "panel" is a defined section of an aircraft which contains electronic or power distribution components; however, a panel may contain other components. The term "panel" may, in some possible cases, refer to a "line replaceable unit" or "LRU". Thus, in some possible cases, the terms "panel" and "line replaceable unit" might be interchangeable.

As stated above, panels may be connected by one or more buses. A bus is wiring or other electrical components that may carry data or electrical power from one area of the aircraft to another area of the aircraft. In some aircraft, one or more buses are used to electrically connect two or more panels or line replaceable units. Together, the one or more buses and the two or more panels form a network.

Network design in an aircraft may be difficult due to possible requirements for a high degree of redundancy and tolerance to undesirable conditions. An example of an undesired condition might be a panel ceasing to properly function, for whatever reason. In a redundant aircraft system that is tolerant to undesirable conditions, even if a particular panel ceases to function, the system is designed to allow the aircraft to operate as if the aircraft had not experienced an interruption in the function of the particular panel.

Another reason why system design may be difficult is a desire to reduce weight. Increased aircraft weight decreases fuel efficiency. Fuel use is a major expense of the airline industry; therefore, depending on intended use, some aircraft are made as light as possible.

Accordingly, it would be advantageous to have a method and apparatus which takes into account one or more of the issues discussed above, such as designing a redundant system that supports a system's tolerance to undesirable conditions and also minimizes aircraft weight, as well as possibly other issues. The advantageous embodiments described herein address these issues.

SUMMARY

The advantageous embodiments provide for an apparatus including a structure and a first panel operably disposed with respect to the structure. A first plurality of nodes is disposed within the first panel, wherein the first plurality of nodes comprises a first plurality of power distribution network nodes in a first power distribution network, and wherein the first plurality of nodes further comprises a first group of nodes. A second panel is operably disposed with respect to the structure. A second plurality of nodes is disposed within the second panel, wherein the second plurality of nodes comprises a second plurality of power distribution network nodes in a second power distribution network. The second plurality of nodes further comprises a second group of nodes. The first power distribution network is electrically isolated from the second power distribution network. A bus guardian is physically disposed with respect to the structure apart from the first panel and the second panel. The bus guardian is electrically connected to the first panel and to the second panel. The bus guardian is configured to network the first group of nodes and the second group of nodes in a network.

The advantageous embodiments also provide for a method for refitting an aircraft comprising a fuselage, a wing, a first power panel, and a second power panel, wherein the first power panel and the second power panel are electrically connected using a multi-drop bus configuration. The method includes removing the multi-drop bus configuration by electrically disconnecting the first power panel and the second power panel, while retaining first electrical connections within the first power panel and retaining second electrical connections within the second power panel. A line replaceable unit physically disposed with respect to the aircraft is installed apart from the first power panel and the second power panel. The first power panel is electrically connected to the line replaceable unit such that a first group of nodes within the first power panel is connected as a first group to the line replaceable unit. The second power panel is electrically connected to the line replaceable unit such that a second group of nodes within the second power panel is connected as a second group to the line replaceable unit. The line replaceable unit is configured to electrically network the first power panel and the second power panel by networking the first group of nodes and the second group of nodes in a network.

The advantageous embodiments also provide for an apparatus including a line replaceable unit configured to network received signals from a plurality of groups of nodes. The received signals from the plurality of groups of nodes are networked as groups. The line replaceable unit is further configured to isolate a particular group of nodes responsive to detecting an invalid condition with respect to the particular group of nodes.

The advantageous embodiments also provide for another method. This method includes networking received signals from a plurality of groups of nodes, wherein the received signals from the plurality of groups of nodes are networked as groups. The method also includes isolating a particular group of nodes responsive to detecting an invalid condition with respect to the particular group of nodes.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 12 is an illustration of a block diagram of a data processing system in which an advantageous embodiment may be implemented.

DETAILED DESCRIPTION

As described above, it would be advantageous to have redundancy and reliability in a power distribution or data distribution system of an aircraft, while simultaneously saving weight. Desired redundancy and reliability might be obtained by using a star network. In a star network, each individual node of each panel is connected to a hub. Thus, in an aircraft having two or more panels, each of the internal nodes of a first panel might be connected to a hub, and each of the internal nodes of a second panel might be connected to that same hub. The hub networks all of the nodes in both the first and second panels.

A star network may provide for desired reliability and redundancy. However, this configuration also uses a great deal of physical wiring. Physical wiring adds weight to the aircraft. Additionally, a star network is electrically complex.

Desired redundancy and reliability might also be obtained with a multi-drop network using a multi-drop bus configuration. In a multi-drop bus network, nodes are connected to one or more common buses. The buses might, for example, without limitation, take the form of twisted wire pairs that connect nodes but may take any available means for transmitting signals or power. In the case of an aircraft having two or more panels, two or more buses may be used to electrically connect the panels. In an advantageous embodiment, all of the panels may be connected to each of the two or more buses. In turn, in an advantageous embodiment, each of the nodes internal to a given panel is also connected to each of the two or more buses.

A multi-drop bus network provides for desired redundancy and reliability. However, a multi-drop bus network might, in some larger aircraft, present a performance issue. Long buses might be used in larger aircraft. Long buses may possibly result in signal degradation. While reliability and redundancy are not impacted, signal degradation may be undesirable in some circumstances.

The advantageous embodiments described herein recognize these issues. The different advantageous embodiments recognize and take into account a number of different considerations, such as those described above.

For example, the advantageous embodiments described herein address and solve these issues by providing for a hybrid bus guardian network. In a hybrid bus guardian network, groups of nodes are connected to a hybrid bus guardian. The hybrid bus guardian acts as a hub, networking the groups of nodes.

In this manner, for an aircraft, the individual nodes in a given panel are not networked to the hybrid bus guardian. Rather, the entire group of nodes in a given panel is networked to the hybrid bus guardian. Furthermore, the hybrid bus guardian is provided with multiply redundant functionality to be able to detect invalid data in one or more of the panels. Thus, in the event that a panel is not performing as desired, a particular panel can be isolated without affecting the overall performance of the airplane system.

Figure 1:
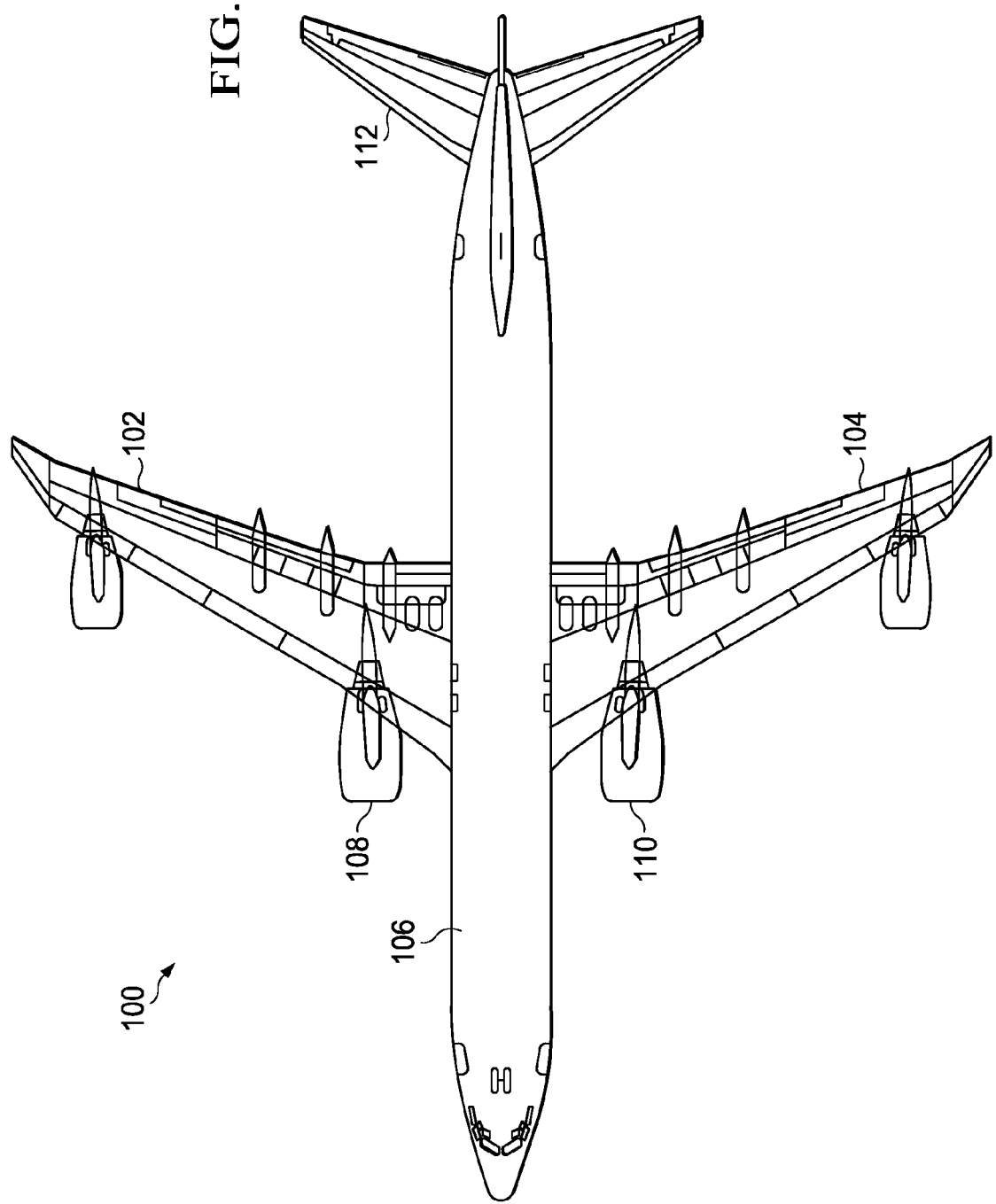
FIG. 1 is an illustration of an aircraft in accordance with an advantageous embodiment.
Figure 2:
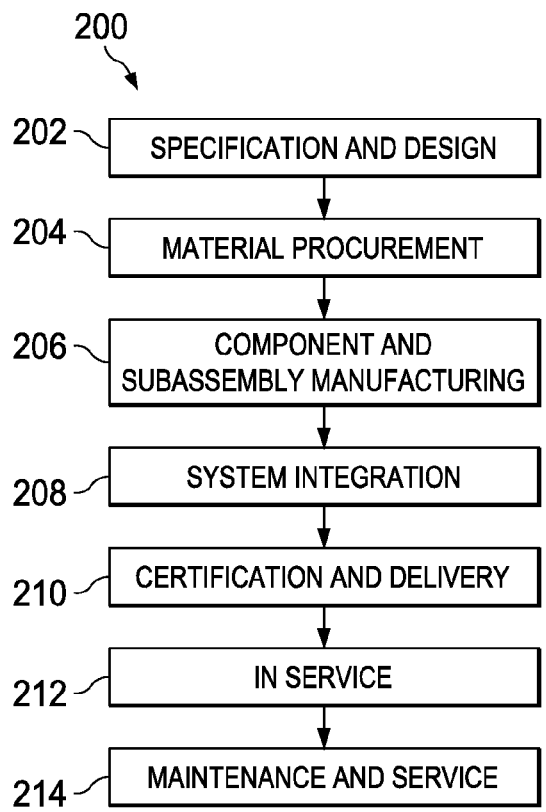
FIG. 2 is an illustration of an aircraft manufacturing and service method in accordance with an advantageous embodiment.
Figure 3:
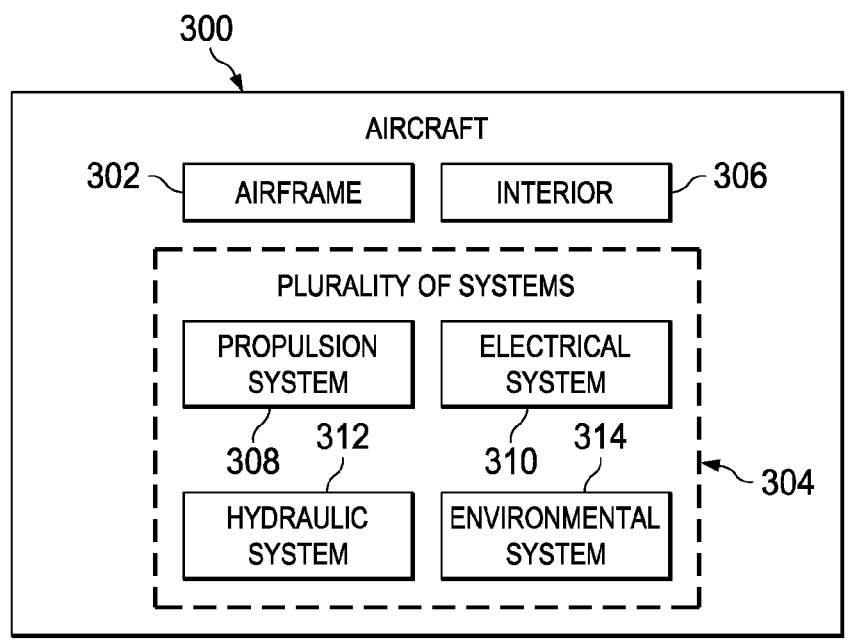
FIG. 3 is an illustration of an aircraft in accordance with an advantageous embodiment.

In order to better understand the context of the advantageous embodiments, exemplary structural and manufacturing environments are now described with respect to FIG. 1 through FIG. 3. FIG. 1 describes a structural environment in the form of an aircraft, and FIG. 2 and FIG. 3 describe a manufacturing environment.

FIG. 1 is an illustration of an aircraft depicted in accordance with an advantageous embodiment. An aircraft 100 is an example of a vehicle in which the advantageous embodiments described herein may be implemented, including the advantageous embodiments relating to networks and power distribution networks. In this illustrative example, the aircraft 100 has wings 102 and 104 attached to a body 106. The aircraft 100 includes wing-mounted engines 108, 110 and a tail 112.

Although the advantageous embodiments described herein may relate to aircraft 100. The advantageous embodiments may relate to any structure. Examples of structures include, but are not limited to, aircraft, buildings, watercraft, automobiles, trucks, tanks, or even multiple disparate structures to be connected in a network. Thus, with respect to the advantageous embodiments described herein, the aircraft 100 may be replaced by these structures or any other suitable structure.

FIG. 2 is an illustration of an aircraft manufacturing and service method depicted in accordance with an advantageous embodiment. An aircraft manufacturing and service method 200 may be used to produce an aircraft, such as the aircraft 100 of FIG. 1, having the networks and other advantageous embodiments described herein. During pre-production, the aircraft manufacturing and service method 200 may include a specification and design 202 of the aircraft 100 and a material procurement 204. During production, component and subassembly manufacturing 206 and system integration 208 of the aircraft 100 takes place. Thereafter, the aircraft 100 may go through certification and delivery 210 in order to be placed in service 212. While in service 212 by a customer, the aircraft 100 is scheduled for routine maintenance and service 214 (which may also include modification, reconfiguration, refurbishment, and so on).

Each of the processes of the aircraft manufacturing and service method 200 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of vendors, subcontractors, and suppliers; and an operator may be an airline, leasing company, military entity, service organization, and so on.

FIG. 3 is an illustration of an aircraft depicted in accordance with an advantageous embodiment. An aircraft 300 in FIG. 3 may be the aircraft 100 described with respect to FIG. 1 and FIG. 2. As shown in FIG. 3, the aircraft 300 produced by the aircraft manufacturing and service method 200 of FIG. 2 may include an airframe 302 with a plurality of systems 304 and an interior 306. Examples of the plurality of systems 304 include one or more of a propulsion system 308, an electrical system 310, a hydraulic system 312, and an environmental system 314. Any number of other systems may be included in this example. Although an aerospace example is shown, the principles of the disclosure may be applied to other industries, such as the automotive industry.

Apparatuses and methods embodied herein may be employed during any one or more of the stages of the aircraft manufacturing and service method 200. For example, components or subassemblies corresponding to the component and subassembly manufacturing 206 may be fabricated or manufactured in a manner similar to components or subassemblies produced while the aircraft 100 is in service. Also, one or more apparatus embodiments, method embodiments, or a combination thereof may be utilized during the component and subassembly manufacturing 206 and the system integration 208, for example, without limitation, by substantially expediting assembly of or reducing the cost of the aircraft 100. Similarly, one or more of the apparatus embodiments, method embodiments, or a combination thereof may be utilized while the aircraft 100 is in the service 212, for example, while the aircraft 100 is in service 212 and/or in the maintenance and service 214 in FIG. 2.

Figure 4:
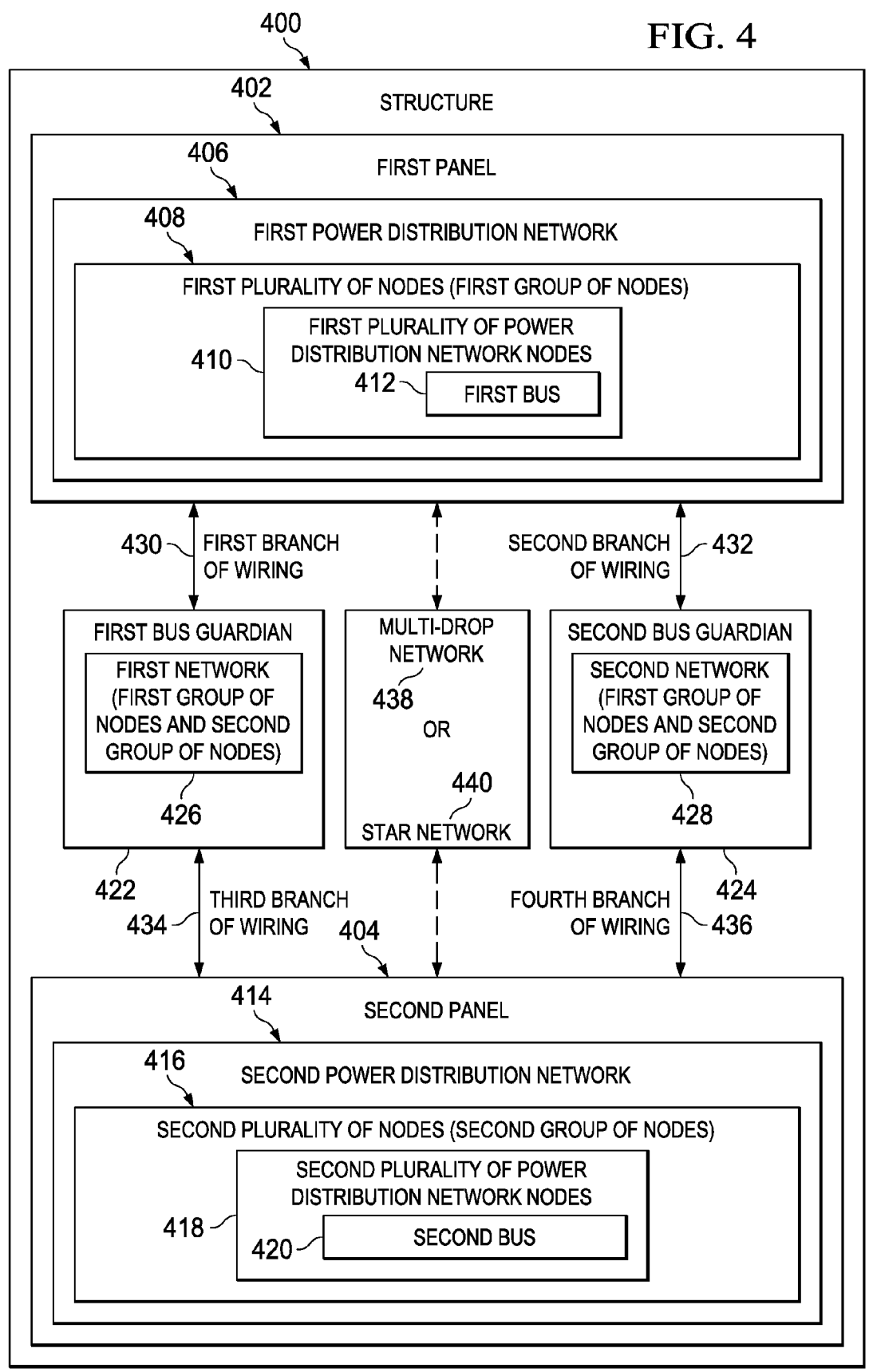
FIG. 4 is an illustration of a block diagram of a structure having power distribution networks in accordance with an advantageous embodiment.

FIG. 4 is an illustration of a block diagram of a structure having power distribution networks depicted in accordance with an advantageous embodiment. A structure 400 of FIG. 4 may be, for example, the aircraft 100 of FIG. 1. However, the structure 400 may be any structure or vehicle, including buildings and other kinds of vehicles, as described above.

The structure 400 may include one or more panels. As described above, the term "panel" refers to a section of an aircraft that contains electronics or other components. A panel may contain components used to either generate or distribute power. Many panels include one or more internal nodes, such as power distribution nodes, that are the hubs used to connect other electrical components within the panel itself. Together, these one or more internal nodes may form a group of nodes for a given panel.

In an advantageous embodiment, the structure 400 includes a first panel 402 and a second panel 404. However, more or fewer panels may be present. In an advantageous embodiment, the first panel 402 may include a first power distribution network 406. The first power distribution network 406 may include a first plurality of nodes 408. The first plurality of nodes 408 may be characterized as a first group of nodes. The first plurality of nodes 408 may include, in particular, a first plurality of power distribution network nodes 410. The first power distribution network 406, the first plurality of nodes 408, and the first plurality of power distribution network nodes 410 may include a first bus 412 that connects the various components within the first panel 402.

Like the first panel 402, the second panel 404 may include similar components. Thus, for example, without limitation, the second panel 404 may include a second power distribution network 414. The second power distribution network 414 may include a second plurality of nodes 416. The second plurality of nodes 416 may be characterized as a second group of nodes. The second plurality of nodes 416 may include, in particular, a second plurality of power distribution network nodes 418. The second power distribution network 414, the second plurality of nodes 416, and the second plurality of power distribution network nodes 418 may include a second bus 420 that connects the various components within the second panel 404. The first panel 402 and the second panel 404 may be connected by one or more additional, inter-panel buses.

In an advantageous embodiment, the first panel 402 and the second panel 404 may be electrically connected by a first bus guardian 422. In addition, optionally, the first panel 402 and the second panel 404 may also be electrically connected by a second bus guardian 424. More or fewer bus guardians may be associated with or otherwise connect the first panel 402, the second panel 404, or any other panels that are present.

As used herein, the term "bus guardian" refers to a device configured to network two or more components together in the manner described elsewhere herein, wherein the device is connected to the two or more components using one or more buses. The various "bus guardian" configurations described herein are distinguished from, and are different than, a "hub," "router," or "switch," which might be used to connect network components in different networks. The differences between a "bus guardian" of the advantageous embodiments and these other network components are described further below. However, to illustrate just one of many differences, the "bus guardian" of the advantageous embodiments does not have the limitation of collisions present in a "hub". A "hub" may operate in a Carrier Sense Multiple Access/Collision Avoidance (CSMA/CA) mode where collisions can occur randomly. However, with the "bus guardian" of the advantageous embodiments, groups of nodes in the advantageous embodiments can never collide. Similarly, not necessarily for the same reason, the "bus guardian" of the advantageous embodiments may be distinguished from a "switch" or a "router".

The first bus guardian 422 may act as a first network 426 between the first panel 402 and the second panel 404. In an advantageous embodiment, the first network 426 may connect only the first group of nodes of the first plurality of nodes 408 to the second group of nodes of the second plurality of nodes 416.

Likewise, the second bus guardian 424 may act as a second network 428 between the first panel 402 and the second panel 404. In an advantageous embodiment, the second network 428 may connect only the first group of nodes of the first plurality of nodes 408 to the second group of nodes of the second plurality of nodes 416.

The first bus guardian 422 and the second bus guardian 424 may be connected to the first panel 402 and the second panel 404 by means of branches of wiring, or by any other suitable means for electrically connecting objects. In an advantageous embodiment, the first bus guardian 422 is connected to the first panel 402 by a first branch of wiring 430. The second bus guardian 424 may be connected to the first panel 402 by a second branch of wiring 432. The first bus guardian 422 may be connected to the second panel 404 by a third branch of wiring 434. The second bus guardian 424 may be connected to the second panel 404 by a fourth branch of wiring 436.

In an advantageous embodiment, the first branch of wiring 430 connecting the first bus guardian 422 to the first panel 402 has a first length that is about one third of a second length of wiring that would be used had the first panel 402 and the second panel 404 been connected by a multi-drop network 438. In another advantageous embodiment, a first total wiring length for an overall system, including the first, second, third, and fourth branches of wiring 430, 432, 434, and 436, is about 10 times less than a second total wiring length that would have been used had the first plurality of nodes 408 and the second plurality of nodes 416 been connected by a star network 440.

In an advantageous embodiment, the structure 400 may be an aircraft comprising a fuselage and a wing connected to the fuselage. In this case, the bus guardian, first panel, and second panel may be disposed in the fuselage.

In an advantageous embodiment, either the first bus guardian 422 or the second bus guardian 424 may be configured to, in the event of the first panel not operating as desired, continue to route other communications to the second panel 404 in such a way as to enable the second panel 404 to continue to route power or data to components within the structure 400. More generally, in the event of inoperability of any given set of panels, either the first bus guardian 422 or the second bus guardian 424, or both, may enable communication to continue among the remaining panels and possibly other components within the structure 400. In this manner, the redundancy logic for any remaining functionality of components within the structure 400 will allow power or data to continue to be distributed to loads previously served by the given set of inoperable panels.

If present, the second bus guardian 424 may be electrically connected to the first panel 402 and to the second panel 404 such that the second bus guardian 424 is electrically isolated from the first bus guardian 422. The second bus guardian 424 may be configured to network the first group of nodes of the first plurality of nodes 408 and the second group of nodes of the second plurality of nodes 416 in a network distinct from the first and second power distribution networks 406 and 414.

In an advantageous embodiment, the first plurality of power distribution network nodes 410 within the first panel 402 may be connected in a multi-drop configuration. Likewise, the second plurality of power distribution network nodes 418 within the second panel 404 may be connected in a multi-drop configuration.

In an advantageous embodiment, the structure 400 may be an aircraft comprising a fuselage and a wing. In this case, the network provided by the first bus guardian 422 and the second bus guardian 424 may be configured to provide robust protection against one or more undesired conditions in the network, such as if an undesired condition arises in one or more components of the network. An undesired condition in or for a component is a condition in which a component does not operate in a desired manner.

For example, if the first panel 402 produced weak, corrupt, or inadequate signals, or experienced an interruption in service, either the first bus guardian 422 or the second bus guardian 424 may be configured to continue desired operation of the overall network such that a user does not experience a change in an overall service level delivered by the overall network. In this manner, the first bus guardian 422 and/or the second bus guardian 424 are configured to provide protection against one or more undesired conditions in the network.

Figure 8:
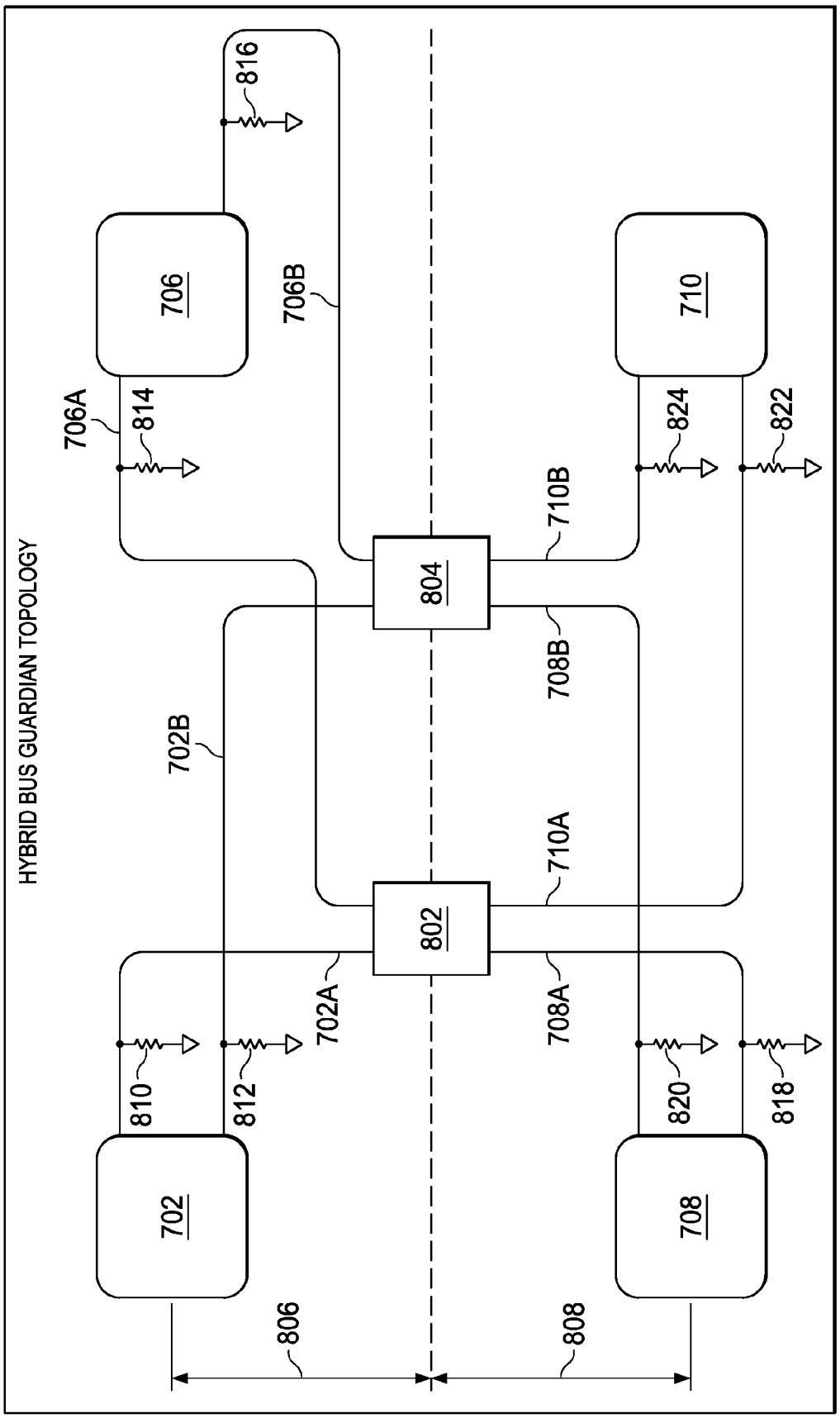
FIG. 8 is an illustration of a block diagram of a hybrid bus guardian topology in accordance with an advantageous embodiment.
Figure 9:
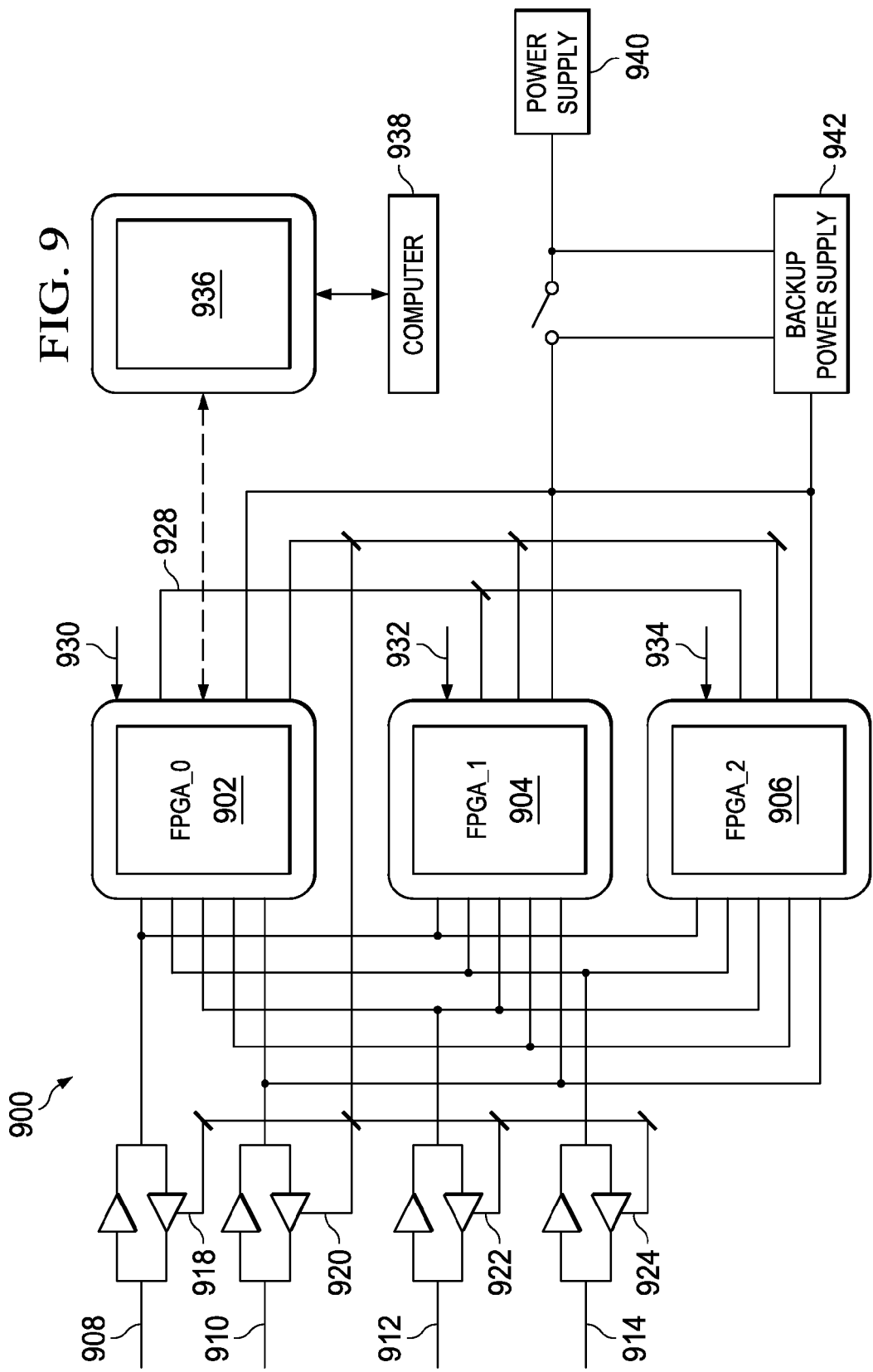
FIG. 9 is an illustration of a block diagram of a hybrid bus guardian in accordance with an advantageous embodiment.

Actual configuration of the first bus guardian 422 and/or the second bus guardian 424 to achieve this result is described in more detail with respect to FIG. 8 and FIG. 9. For example, one or both of the first bus guardian 422 and the second bus guardian 424 may be configured to network groups of nodes, or may be configured using other techniques described herein.

In an advantageous embodiment, either the first bus guardian 422 or the second bus guardian 424 may be further configured to electrically isolate one of the first panel 402 and the second panel 404 in the event of an interruption in service in one of the first panel 402 and/or the second panel 404. Thus, any given panel within the structure 400 may be isolated using the advantageous embodiments described herein.

In an advantageous embodiment, either the first bus guardian 422 or the second bus guardian 424 may include additional features. For example, either the first bus guardian 422 or the second bus guardian 424 may be a bus guardian 500 of FIG. 5.

The structure 400, the first and second power distribution networks 406 and 414, the first and second bus guardians 422 and 424, and other components shown in FIG. 4 may overcome the problems faced by prior devices and methods, and achieve the benefits described above. However, the illustration of the structure 400, the first and the second power distribution networks 406 and 414, the first and the second bus guardians 422 and 424, and other components in FIG. 4 are not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
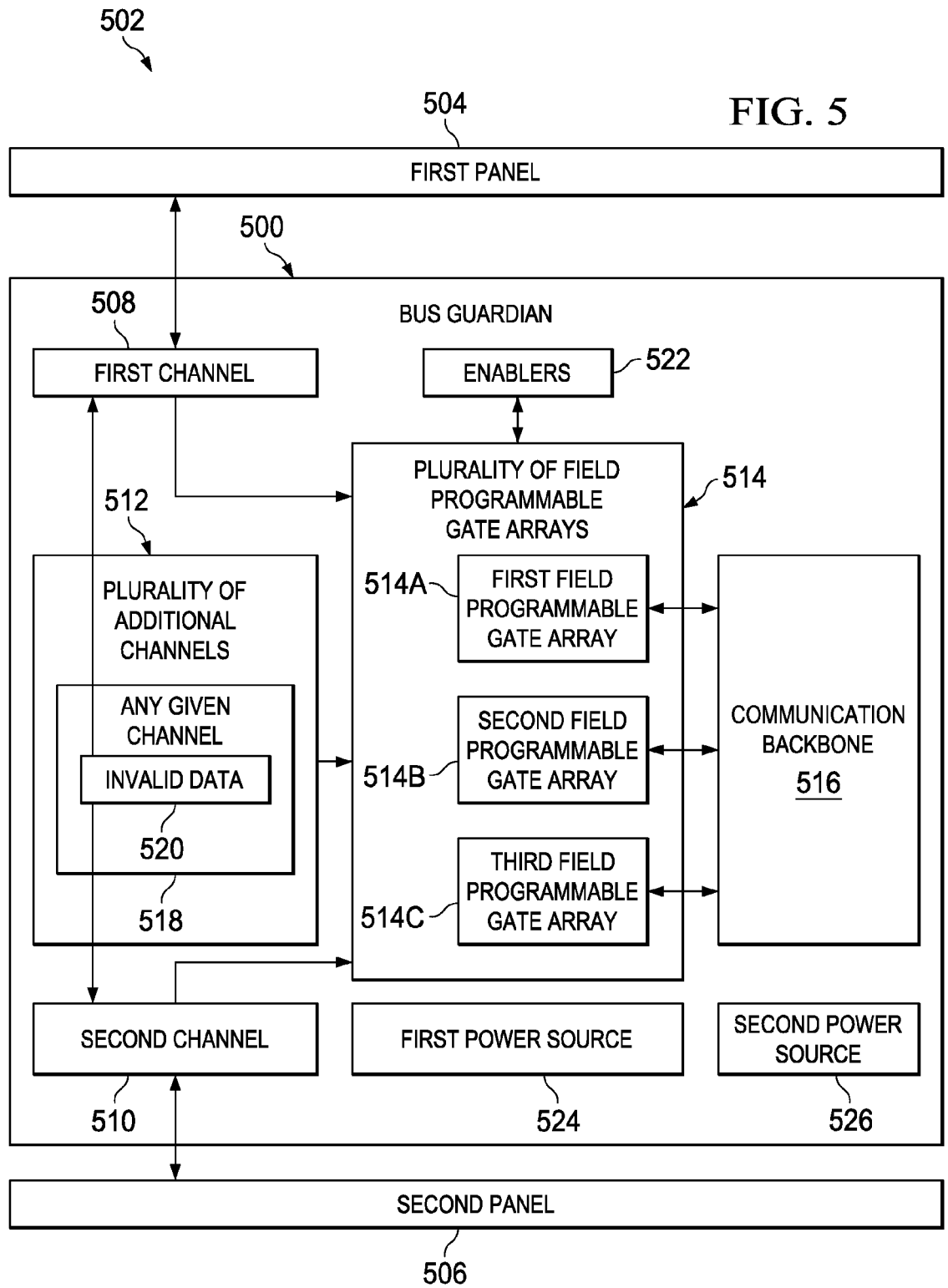
FIG. 5 is an illustration of a block diagram of a bus guardian in a power distribution network in accordance with an advantageous embodiment.

FIG. 5 is an illustration of a block diagram of a bus guardian in a power distribution network depicted in accordance with an advantageous embodiment. The bus guardian 500 may be used in a structure, such as the structure 400 shown in FIG. 4. For example, the bus guardian 500 may be either or both of the first bus guardian 422 and the second bus guardian 424 of FIG. 4. The bus guardian 500 may also be referred to as line replaceable unit ("LRU") or possibly may also be referred to as a "panel" in different advantageous embodiments. A power distribution network 502 may include the bus guardian 500 connected to a first panel 504 and a second panel 506. The first panel 504 and the second panel 506 may be the first panel 402 and the second panel 404 in FIG. 4.

The bus guardian 500 may include a first channel 508 for receiving signals from the first panel 504. Likewise, the bus guardian 500 may include a second channel 510 for receiving signals from the second panel 506. A plurality of additional channels 512 may also be present for receiving signals from corresponding additional panels (not shown), if present.

In turn, the first channel 508, the second channel 510, and the plurality of additional channels 512 may be connected to a plurality of field programmable gate arrays 514 (FPGAs) connected by a communication backbone 516. In an advantageous embodiment, the plurality of field programmable gate arrays 514 may include a first field programmable gate array 514A, a second field programmable gate array 514B, and a third field programmable gate array 514C. More or fewer field programmable gate arrays may be present.

One or more of the plurality of field programmable gate arrays 514 may be used in a voting scheme to determine whether invalid data 520 or other invalid signals are actually received from any given channel 518 from among the first channel 508, the second channel 510, or the plurality of additional channels 512. The voting scheme does not determine whether the invalid data 520 is actually invalid, but rather ensures the accuracy of the determination that the received data actually is invalid by requiring a majority of the field programmable gate arrays to make the determination of data invalidity. For example, two of three field programmable gate arrays determine that received data was valid, but the third field programmable gate array determines that the received data was invalid. In this case, it may be deduced that there likely is an error in the third field programmable gate array, and the received data is actually valid. However, if two of the three field programmable gate arrays determined that the data was invalid, it may be deduced that likely the received data actually is invalid.

The invalid data 520 may be any data or signal that indicates some kind of undesirable condition in a panel. For example, the invalid data 520 may be reception of no data or signal at all, corrupted data or signals, data or signals out of a predetermined range, or any other data or signals deemed to be undesirable. The predetermined range may be determined with respect to any desired measure, including, but not limited to, total power received, data packets received per unit time, and others.

If the invalid data 520 or other invalid signals are received, then the plurality of field programmable gate arrays 514 may be used in conjunction with one or more enablers 522 to isolate the any given channel 518 such that the invalid data 520 or other signals are no longer received and are, accordingly, no longer networked. Likewise, if other invalid data or other invalid signals are received via the first channel 508 or the second channel 510, then the plurality of field programmable gate arrays 514 may be used in conjunction with one or more of the enablers 522 to isolate the corresponding first channel 508 and/or the second channel 510. Because one or more panels, such as the first panel 504 or the second panel 506, may or must transmit signals through the first channel 508, the second channel 510, and/or the plurality of additional channels 512 on a one-to-one corresponding basis, isolating a given channel may result in isolating the corresponding panel. For example, in an advantageous embodiment, if the first panel 504 does not operate as desired, then isolating the first channel 508 would result in preventing any signals from the first panel 504 being transmitted through the power distribution network 502.

As used herein the term "does not operate as desired" refers to any operating condition of a component, including a panel, a bus guardian, a node, a wire, or any other component, that is deemed undesirable. Examples of operating conditions that might, under some circumstances but not necessarily others, be considered undesirable could possibly be a component ceasing to operate, a component producing or receiving a signal too weak for desired use, a component producing or receiving a corrupted signal or an undesirably intermittent signal, or other possible conditions.

The bus guardian 500 may be provided with both a first power source 524 and a second power source 526. The second power source 526 might be considered to be a backup power source for use if the first power source 524 does not operate as desired. For example, the second power source 526 may possibly provide power in addition to the first power source 524 if the first power source second bus guardian 424 produces insufficient power relative to a desired power. In another example, the second power source 526 may provide power if the first power source 424 ceases to operate. Many other examples of the first power source 524 not operating as desired are possible, as are many other examples of operation of the second power source 526.

The features described with respect to FIG. 5 may also be used in the structure 400 shown in FIG. 4. For example, in an advantageous embodiment, the first bus guardian 422 may include the first channel 508 electrically connected to the first panel 402 and also the second channel 510 electrically connected to the second panel 404. In this case, the first bus guardian 422 may include the plurality of field programmable gate arrays 514 electrically connected by the communication backbone 516. The plurality of field programmable gate arrays 514 may be further electrically connected to both the first channel 508 and the second channel 510.

In a similar advantageous embodiment, the bus guardian 500 may include the plurality of additional channels 512. In this case, the plurality of field programmable gate arrays 514 may include the first, the second, and the third field programmable gate arrays 514A, 514B, and 514C configured in such a manner that the bus guardian 500 is capable of shutting down any given channel responsive to the invalid data 520 being detected in the any given channel 518, possibly in conjunction with the enablers 522.

In a related advantageous embodiment, the plurality of field programmable gate arrays 514 may be electrically connected both to the first power source 524 and also to the second power source 526 configured to provide power to the plurality of field programmable gate arrays 514 if the first power source 524 does not operate as desired.

The bus guardian 500 and other components shown in FIG. 5 may overcome the problems faced by prior devices and methods and achieve the benefits described above. However, the illustration of the bus guardian 500 in FIG. 5 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 6:
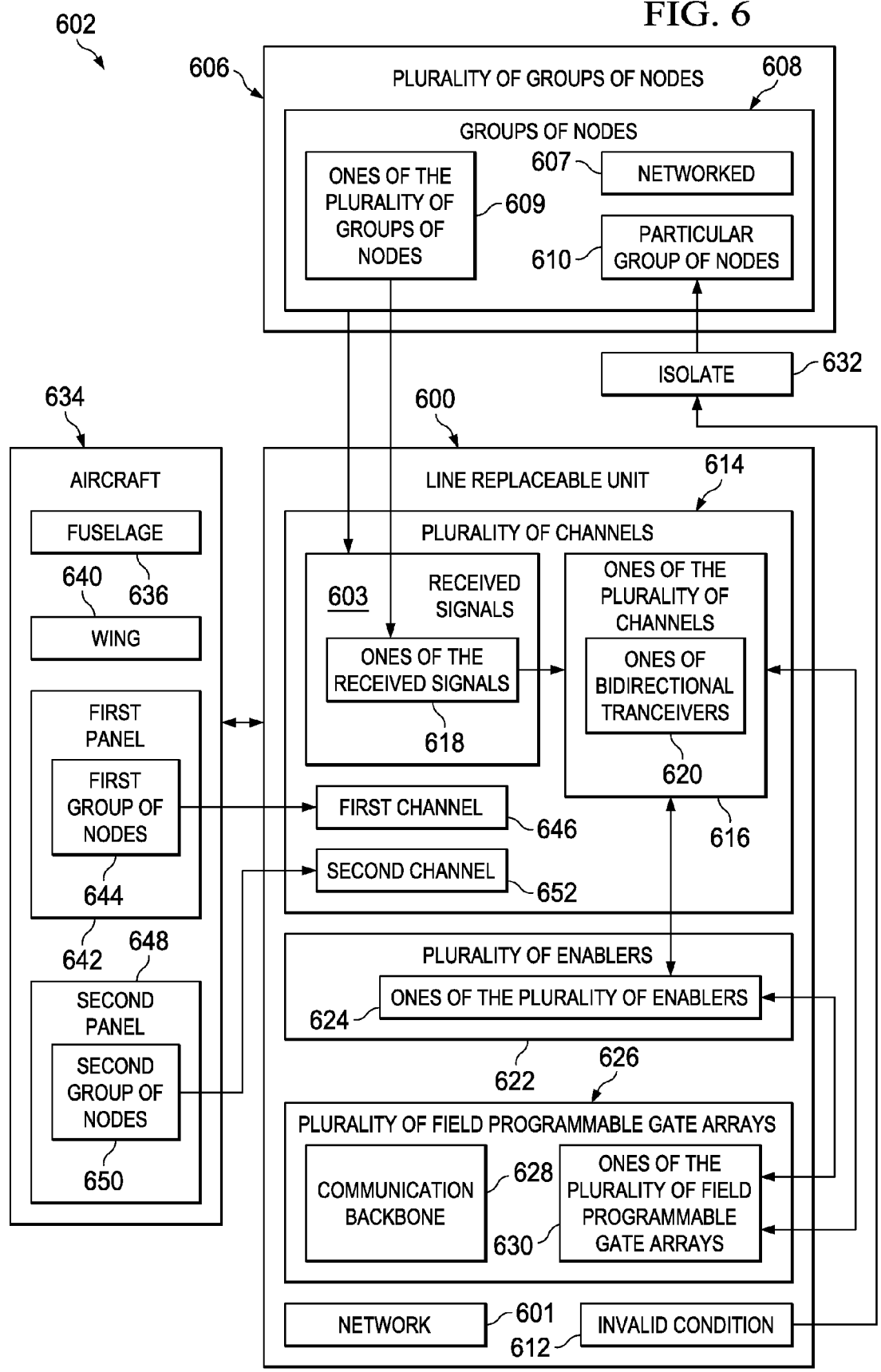
FIG. 6 is an illustration of a block diagram of a line replaceable unit, a plurality of groups of nodes, and an aircraft in accordance with an advantageous embodiment.

FIG. 6 is an illustration of a block diagram of a line replaceable unit, a plurality of groups of nodes, and an aircraft depicted in accordance with an advantageous embodiment. A line replaceable unit 600 may be a bus guardian, such as the bus guardian 500 of FIG. 5 or the first bus guardian 422 or the second bus guardian 424 of FIG. 4. The line replaceable unit 600 may be part of a power distribution network 602, which could also be the power distribution network 502 of FIG. 5. A line replaceable unit 600 may also be a panel, such as the first panel 402 and/or the second panel 404 of FIG. 4, and/or possibly the first panel 504 or the second panel 506 of FIG. 5. In the advantageous embodiments shown in FIG. 6, the line replaceable unit 600 is a bus guardian, such as the bus guardian 500 of FIG. 5.

The line replaceable unit 600 may be configured to network 601 received signals 603 from a plurality of groups of nodes 606. The received signals 603 from the plurality of groups of nodes 606 may be networked 607 as groups, such as groups of nodes 608. The line replaceable unit 600 may also be configured to isolate 632 a particular group of nodes 610 responsive to detecting an invalid condition 612 with respect to the particular group of nodes 610. As used herein, the term "invalid condition" refers to a node or a group of nodes or some other device that does not operate as desired.

In an advantageous embodiment, the line replaceable unit 600 also may include a plurality of channels 614 configured to receive the received signals 603. Ones of the plurality of channels 616 may be configured to receive ones of the received signals 618 from corresponding ones of the plurality of groups of nodes 609. The ones of the plurality of channels 616 may further include corresponding ones of bidirectional transceivers 620. As used herein, the term "ones" establishes a one-to-one relationship between a first set of individuals in one group and a second set of individuals in a second group. Thus, in an advantageous embodiment, a given channel in "the plurality of channels 616" may have a one-to-one relationship with a given received signal in "received signals 616," which may have a one-to-one relationship with a given node in "the plurality of groups of nodes 609."

In an advantageous embodiment, the line replaceable unit 600 may further include a plurality of enablers 622. Ones of the plurality of enablers 624 may be connected to the ones of the plurality of channels 616. The ones of the plurality of enablers 624 may be configured to turn on or turn off the ones of the plurality of channels 616.

In an advantageous embodiment, the line replaceable unit 600 may further include a plurality of field programmable gate arrays 626 connected to each other by a communication backbone 628. Ones of the plurality of field programmable gate arrays 630 may be connected to the ones of the plurality of channels 616 and also to the ones of the plurality of enablers 624.

In an advantageous embodiment, the line replaceable unit 600 may be part of an aircraft 634 comprising a fuselage 636 and a wing 640. The aircraft 634 may be connected to the line replaceable unit 600 both physically and electrically.

In this advantageous embodiment, a first panel 642 may be connected to the aircraft 634. The first panel 642 may contain at least a first group of nodes 644 from the plurality of groups of nodes 606. The first group of nodes 644 may be connected as a first group to a first channel 646 of the plurality of channels 614. Additionally, a second panel 648 may be connected to the aircraft 634. The second panel 648 may contain at least a second group of nodes 650 from the plurality of groups of nodes 606 that is different than the first group of nodes 644. The second group of nodes 650 may be connected as a second group to a second channel 652 of the plurality of channels 614.

The line replaceable unit 600 and other components shown in FIG. 6 may overcome the problems faced by prior devices and methods and achieve the benefits described above. However, the illustration of the line replaceable unit 600 in FIG. 6 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 7:
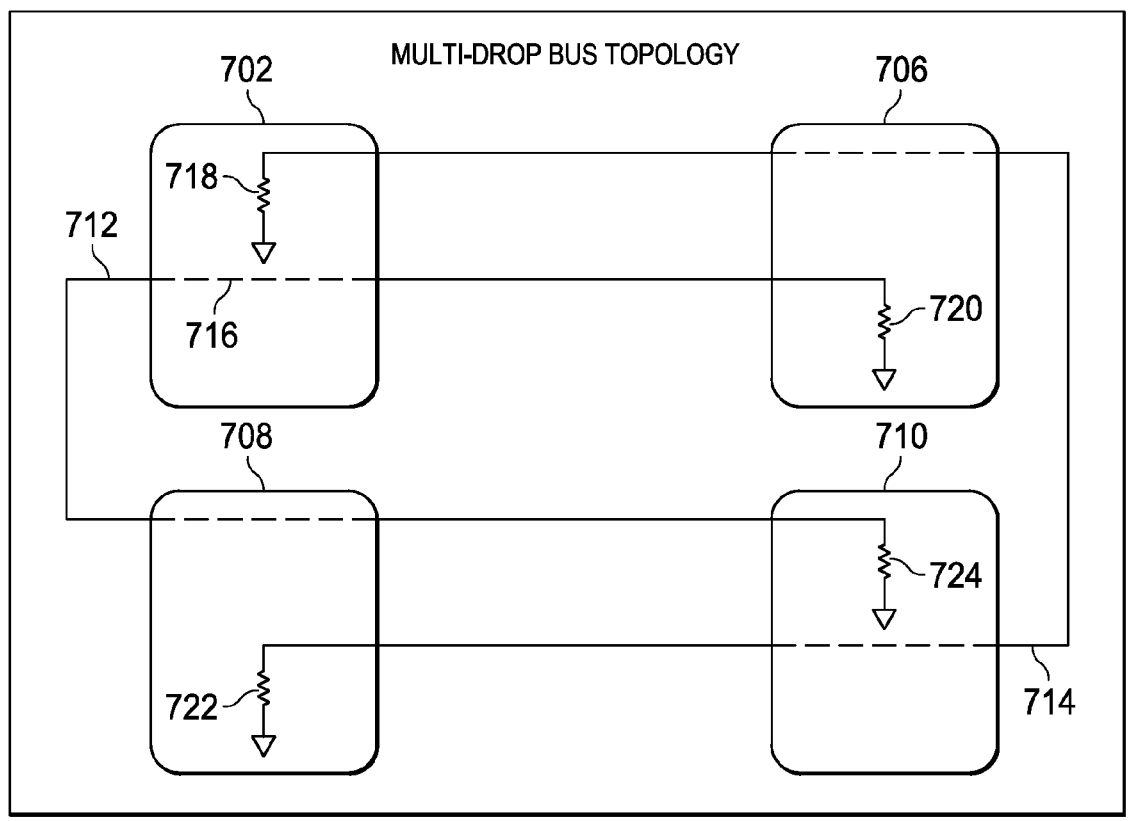
FIG. 7 is an illustration of a block diagram of a multi-drop bus topology in accordance with an advantageous embodiment.

FIG. 7 is an illustration of a block diagram of a multi-drop bus topology depicted in accordance with an advantageous embodiment. Multi-drop bus topology 700 may be an electrical system, such as the electrical system 310 of FIG. 3. The multi-drop bus topology 700 is an example of a multi-drop network, such as the multi-drop network 438 of FIG. 4.

The multi-drop bus topology 700 shown in FIG. 7 includes four panels: a first panel 702, a second panel 706, a third panel 708, and a fourth panel 710. As with the panels described above, each of these four panels contain one or more power distribution nodes that connect to other electrical components within the corresponding panel.

Each of these four panels is connected by a first bus 712 and a second bus 714. Additionally, each of the first bus 712 and the second bus 714 are electrically connected to each of the power distribution nodes within a corresponding panel. For example, a power distribution node 716 within the first panel 702 is connected to both the first bus 712 and the second bus 714. Note that while the power distribution node 716 is shown as a single power distribution node, the power distribution node 716 may also represent multiple power distribution nodes, each of which may be connected to both the first bus 712 and the second bus 714.

In an advantageous embodiment, the multi-drop bus topology 700 may be a power distribution network in an aircraft. In this case, the first bus 712 and the second bus 714 may be characterized as two aircraft digital communication buses where many total line replaceable unit nodes, distributed among the four different panels, are connected to each of the first bus 712 and the second bus 714. The total number of line replaceable unit nodes may be two, ten, twenty, one-hundred, or more, wherein each of the panels holds one or more nodes. These digital communication buses may be routed through diverse paths in the airframe in order to provide physical separation. Physical separation may increase reliability. However, in this configuration, both the first bus 712 and the second bus 714 are routed into a single physical power panel, lightning protection units, backplanes, and other areas. As a result, an undesirable condition in one panel might possibly result in an undesirable condition across the entire multi-drop bus topology 700, possibly for both the first bus 712 and the second bus 714.

In an advantageous embodiment, the first bus 712 and the second bus 714 may be transmission lines over which data or power is communicated using one or more protocols, such as, but not limited to, a Time-Triggered Protocol (TTP), including, but not limited to, TTP/c protocol. In a particular advantageous embodiment, the transmission lines may be an RS-485 differential signal physical layer with a TTP/c protocol layer providing digital communication between each of the four panels. In some advantageous embodiments, about several hundred feet of transmission line may constitute a maximum length of wire while maintaining a de-rated communication bus rate of several megabits per second, such as, but not limited to, a rate range between about one to about 10 megabits per second. This maximum length for a given desired performance might be an issue in some larger commercial aircraft that have increased distance between forward and aft line replaceable units. As a result, the multi-drop bus topology 700 shown in FIG. 7 might be a bus topology that does not perform as well as desired for some possible aircraft.

As an alternative for these larger aircraft, a traditional star network bus topology might be used. In a traditional star network (not shown), every power transmission node in each of the four panels shown in the multi-drop bus topology 700 of FIG. 7 is connected to a central hub. This configuration reduces the maximum transmission line length of any given line connecting a given power distribution node within a given panel to the central hub.

However, the total length of wiring used in a star network is dramatically increased over the wiring length of the multi-drop bus topology 700 shown in FIG. 7 because each power distribution node within each panel is connected to the hub. In fact, as much as 10 times as much wiring, or more, might be used in implementing this traditional star network relative to implementing the multi-drop bus topology 700 shown in FIG. 7. This additional wiring increases the weight of an aircraft, possibly by several hundred pounds for larger aircraft, and so undesirably decreases fuel efficiency.

Still further, in some larger commercial aircraft, a traditional star network might require a many-channel, dual redundant bus isolator to connect to each line replaceable unit individually. This arrangement is very difficult to achieve because the line replaceable units may be contained within each power panel in groups that are plugged into backplanes, whereas the TTP/c bus wires connect to the panels only in one place for each redundant bus. Thus, again, a traditional star network may not present a desirable solution.

Each of the panels in the multi-drop bus topology 700 may include one or more termination resistors. A termination resistor is an electrical resistor that may be placed at the end, or termination, of an electrical line in order to reduce electrical reflections in a line. Termination resistors may be active or passive, and may be implemented using multiple resistors. Thus, the resistors shown do not necessarily limit the electronic configuration of the advantageous embodiments.

In one possible illustrative example, the first panel 702 may be in electrical communication with a first termination resistor 718, the second panel 706 may be in electrical communication with a second termination resistor 720, the third panel 708 may be in electrical communication with a third termination resistor 722, and the fourth panel 710 may be in electrical communication with a fourth termination resistor 724. More or fewer termination resistors may be present if more or fewer panels are present. In addition, more or fewer termination resistors may be in electrical communication with any given panel. Not all panels necessarily have the same number of termination resistors.

In optional advantageous embodiment, one or more of the termination resistors may be connected to a bus, such as either or both of the first bus 712 and the second bus 714. Optionally, the termination resistors may be physically placed inside one or more the panels.

In another optional advantageous embodiment, each of these termination resistors may be physically located outside the corresponding panels. For example, one or more of the termination resistors shown may optionally be built into cable assemblies and thereby be made external to the panels. By physically locating termination resistors outside of the panels, impact to the internal configuration of the panels may be minimized. Accordingly, replacement of any given panel may be performed more easily.

The multi-drop bus topology 700 and other components shown in FIG. 7 may overcome the problems faced by prior devices and methods and achieve the benefits described above. However, the illustration of the multi-drop bus topology 700 in FIG. 7 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

FIG. 8 is an illustration of a block diagram of a hybrid bus guardian topology depicted in accordance with an advantageous embodiment. A hybrid bus guardian topology 800 may be an electrical system, such as the electrical system 310 of FIG. 3. The hybrid bus guardian topology 800 may be either the first bus guardian 422 or the second bus guardian 424 of FIG. 4. The hybrid bus guardian topology 800 may also be the bus guardian 500 of FIG. 5 or the line replaceable unit 600 of FIG. 6. The hybrid bus guardian topology 800 may be an alternative topology to the multi-drop bus topology 700 of FIG. 7.

Like the multi-drop bus topology 700 of FIG. 7, four panels are present in this illustrative example, although more or fewer panels may be present. Because the panels might be considered the same in some advantageous embodiments, the panels in FIG. 8 share the same reference numerals and have the same characteristics as the panels described with respect to FIG. 7.

However, a difference between the multi-drop bus topology 700 of FIG. 7 and the hybrid bus guardian topology 800 of FIG. 8 is the presence of two hybrid bus guardians (HBGs), a first hybrid bus guardian 802 and a second hybrid bus guardian 804. Although two hybrid bus guardians are shown in FIG. 8, more or fewer hybrid bus guardians might be present. As used herein, the term "hybrid" refers to the fact that the first hybrid bus guardian 802 and the second hybrid bus guardian 804 create the hybrid bus guardian topology 800 to have mixed characteristics of both a multi-drop network and a traditional star network.

As shown by the wiring, each of the four panels is connected to both of the hybrid bus guardians. Thus, for example, the first panel 702, the second panel 706, the third panel 708, and the fourth panel 710 are connected to the first hybrid bus guardian 802. Likewise, each of these panels is also connected to the second hybrid bus guardian 804.

Each of these four panels has one or more power distribution nodes or other kind of networking nodes. Each of the power distribution nodes or other kind of network nodes within each panel connects a plurality of electrical components within a given panel. In an advantageous embodiment, these nodes may be connected internally in a given panel using a multi-drop network. In another advantageous embodiment, these nodes may be connected internally in a given panel using a traditional star network, or even a distinct hybrid bus guardian topology.

In this advantageous embodiment, the hybrid bus guardian topology 800 of FIG. 8 networks groups of power transmission nodes. Each panel includes one group of power transmission nodes. Thus, for example, the first panel 702 may include a first plurality of power transmission nodes. This first plurality of power transmission nodes are connected as a single group to the first hybrid bus guardian 802, and possibly also to the second hybrid bus guardian 804. Likewise, the second panel 706 may include a second plurality of power transmission nodes. This second plurality of power transmission nodes are connected as a single group to the first hybrid bus guardian 802, and possibly also to the second hybrid bus guardian 804.

The first hybrid bus guardian 802, and possibly the second hybrid bus guardian 804, each network the first group of nodes from the first panel 702 and the second group of nodes from the second panel 706. In an advantageous embodiment, if both the first hybrid bus guardian 802 and the second hybrid bus guardian 804 are present, then each may be an autonomous, independently operating network in order to provide additional redundancy to the overall hybrid bus guardian topology 800. The third panel 708 and the fourth panel 710 may be connected to the first hybrid bus guardian 802, and possibly also to the second hybrid bus guardian 804.

Thus, for example, each of these four panels may be connected to the first hybrid bus guardian 802 using one corresponding wiring branch, including a first wiring branch 702A, a second wiring branch 706A, a third wiring branch 708A, and a fourth wiring branch 710A. Likewise, each panel may be connected to the second hybrid bus guardian 804 using one corresponding wiring branch, including a fifth wiring branch 702B, a sixth wiring branch 706B, a seventh wiring branch 708B, and an eighth wiring branch 710B.

The length of each of these wiring branches may vary. However, in an advantageous embodiment, even for larger aircraft, any given wiring branch may have a maximum length that is about one third of the total length of a bus transmission line used in a multi-drop bus topology. Thus, for example, without limitation, the first wiring branch 702A might have a maximum length that is less than one third a total length of the first bus 712 of FIG. 7.

The length of a given wiring branch in hybrid bus guardian topology 800 may be represented by arrows 806 and 808, each of which might be 100 feet or less even in larger aircraft for a panel near the forward or aft portions of the larger aircraft. This length is substantially less than the several hundred feet of wiring at which undesirable signal degradation might occur, described above. Still further, the hybrid bus guardian topology 800 in FIG. 8 uses substantially less total wiring than a full star network, described above. In other words, the combined length of all wiring branches, including the first wiring branch 702A through the eighth wiring branch 710B, is substantially less that the grand total wiring length had a traditional star network been implemented among the four panels shown. In an advantageous embodiment, the total wiring length of all wiring branches for the hybrid bus guardian topology 800 may be three times less than the total wiring of a traditional star network, and might be much less than this amount.

An additional advantage to the hybrid bus guardian topology 800 shown in FIG. 8 is the ability to retrofit easily a structure that has an original multi-drop bus configuration, such as that shown in FIG. 7. Thus, for example, an aircraft having the four panels shown in FIG. 8 might have been manufactured with the multi-drop bus topology 700 shown in FIG. 7. In an advantageous embodiment, the various panels are left undisturbed, but for disconnecting the original buses among the different panels. The hybrid bus guardians are installed, and the wiring connected as shown in the hybrid bus guardian topology 800 of FIG. 8. In this manner, the software for operating the overall system, as well as software for operating each individual panel, may remain unchanged. Thus, for example, power distribution software may remain unchanged when installing the hybrid bus guardian topology 800 of FIG. 8. In other words, power distribution software may be retained, or otherwise remain unchanged after a refit or retrofit is performed to remove a multi-drop configuration and install the hybrid bus guardian topology 800. In this case, the software may continue to operate as if no change had been made. This fact represents a substantial time and cost savings. This fact may represent a further additional time and cost savings if new software would have to be certified, such as in the case of DO-178B software. An example of a method for refitting an aircraft with a hybrid bus guardian topology is shown in FIG. 9.

Thus, the hybrid bus guardian topology 800 provides hybrid star network isolation, as well as intelligent bus fault monitoring and isolation, if a fault were to occur at the power panel level without the impractical approach of connecting each node within a panel individually. The hybrid nature of this connection allows for easy and flexible connection to each panel with only an alteration to the wiring harness. Changes to the power panels, the internal line replaceable unit electronics, or software are not needed.

In summary, an existing multi-drop bus network may connect a plurality of channels of many nodes each on a common bus. This configuration may experience non-deterministic modes in which invalid data might be produced. The advantageous embodiments resolve the non-deterministic behavior of a single fault at the panel level by isolating groups of nodes that are still bused together at a multi-drop level, but not across the entire system.

Additionally, in an existing point to point star network, many channels can be connected in a point to point network and each node can be monitored for invalid data. Although this configuration might be desirable for a greater network quality of service, this configuration might result in far too many wires and connectors, weight, and complexity of routing individual TTP/c twisted part connections to individual line replaceable units within a panel based system. The advantageous embodiments solve these issues by minimizing the number of individual wire runs to be connected at the panel level to successfully isolate any single source of invalid data within a power panel.

Thus, the advantageous embodiments provide for a means that allows the connection of groups of network nodes that are contained within panels. This configuration allows a retrofit capability into an already completed system which was previously connected via a multi-drop bus network scheme. This configuration also may provide a dual redundant active bus repeater, network routing aware monitoring, and fault isolation functions to groups of TTP/c nodes. This configuration may be easily retrofitted into existing airplane configurations without changes to line replaceable unit electronics or software.

Each of the panels in the hybrid bus guardian topology 800 may include one or more termination resistors. As with the termination resistors shown in FIG. 7, the termination resistors shown in FIG. 8 do not necessarily limit the electronic configuration of the advantageous embodiments.

In one possible illustrative example, the first panel 702 may be in electrical communication with a first termination resistor 810 and a second termination resistor 812. The second panel 706 may be in electrical communication with a third termination resistor 814 and a fourth termination resistor 816. The third panel 708 may be in electrical communication with a fifth termination resistor 818 and a sixth termination resistor 820. The fourth panel 710 may be in electrical communication with a seventh termination resistor 822 and an eighth termination resistor 824. More or fewer termination resistors may be present if more or fewer panels are present. In addition, more or fewer termination resistors may be in electrical communication with any given panel. Not all panels necessarily have the same number of termination resistors. Optionally, the termination resistors may be physically placed inside one or more the panels.

In an optional advantageous embodiment, each of these termination resistors may be physically located outside the corresponding panels. For example, one or more of the termination resistors shown may optionally be built into cable assemblies and thereby be made external to the panels. This arrangement is shown by placing the first termination resistor 810 along the first wiring branch 702A, the second termination resistor 812 along the fifth wiring branch 702B, the third termination resistor 814 along the second wiring branch 706A, the fourth termination resistor 816 along the sixth wiring branch 706B, the fifth termination resistor 818 along the third wiring branch 708A, the sixth termination resistor 820 along the seventh wiring branch 708B, the seventh termination resistor 822 along the fourth wiring branch 710A, and the eighth termination resistor 824 along the eighth wiring branch 710B. Other arrangements are also possible, as indicated above.

By physically locating termination resistors outside of the panels, impact to the internal configuration of the panels may be minimized. Accordingly, replacement of any given panel may be performed more easily.

The hybrid bus guardian topology 800 and other components shown in FIG. 8 may overcome the problems faced by prior devices and methods and achieve the benefits described above. However, the illustration of the hybrid bus guardian topology 800 in FIG. 8 is not meant to imply physical or architectural limitations to the manner in which different advantageous embodiments may be implemented. Other components in addition to and/or in place of the ones illustrated may be used. Some components may be unnecessary in some advantageous embodiments. Thus, for example, more or fewer panels may be present in different advantageous embodiments. Similarly, more or fewer bus guardians may be present in different advantageous embodiments. Also, the blocks are presented to illustrate some functional components. One or more of these blocks may be combined and/or divided into different blocks when implemented in different advantageous embodiments.

FIG. 9 is an illustration of a block diagram of a hybrid bus guardian depicted in accordance with an advantageous embodiment. A hybrid bus guardian 900 may be either of the first hybrid bus guardian 802 or the second hybrid bus guardian 804 in FIG. 8. The hybrid bus guardian 900 may also be either the first bus guardian 422 or the second bus guardian 424 in FIG. 4. The hybrid bus guardian 900 may also be the bus guardian 500 in FIG. 5 or the line replaceable unit 600 of FIG. 6. The hybrid bus guardian 900 is an example of one possible configuration for a hybrid bus guardian, though other configurations are possible at least as described further below.

Hybrid bus guardian 900 may include one or more field programmable gate arrays, such as, for example, a first field programmable gate array 902, a second field programmable gate array 904, and a third field programmable gate array 906. More or fewer field programmable gate arrays may be present. Electronic components other than field programmable gate arrays might be used instead, so long as such components provide a similar voting scheme and/or other functions as described below.

The one or more field programmable gate arrays may communicate with the panels in the hybrid bus guardian topology by way of one or more channels. In an advantageous embodiment, one channel might be provided for each panel to be connected to the hybrid bus guardian network. Thus, four channels might be present for the four panel array shown in FIG. 8. These channels may be a first channel 908, a second channel 910, a third channel 912, and a fourth channel 914. These channels communicate signals and/or power individually from the corresponding panels, and may also be used to communicate signals and/or power back from the hybrid bus guardian 900 to the corresponding panels. Thus, for example, referring back to FIG. 8, the first channel 908 may communicate with the first panel 702, the second channel 910 may communicate with the second panel 706, the third channel 912 may communicate with the third panel 708, and the fourth channel 914 may communicate with the fourth panel 710. However, this configuration is exemplary only, as many other arrangements are possible. For example, the correspondence between panels and channels need not be linear or one-to-one, as described above. Still further, more or fewer channels and panels may be present. Yet further, a channel may receive communications from multiple panels.

Along each channel, and in an advantageous embodiment within the hybrid bus guardian 900, one or more enablers may be present. For example, as shown in FIG. 9, four enablers are present, one for each channel. Thus, for example, FIG. 9 shows a first enabler 918 along the first channel 908, a second enabler 920 along the second channel 910, a third enabler 922 along the third channel 912, and a fourth enabler 924 along the fourth channel 914. Again, this arrangement of enablers is exemplary only and may vary, as described above with respect to the channels shown.

In an advantageous embodiment, each enabler may be a bidirectional transceiver configured to turn on or turn off a given channel, though other components may be used that have a function similar to that described below. In an advantageous embodiment, a bidirectional transceiver may specifically be a TTP/c RS-485 transceiver.

In an advantageous embodiment, the first enabler 918 may be used to enable the first channel 908 to transmit signals from the first panel 702 in FIG. 8 through the first channel 908 such that those signals reach the field programmable gate arrays. Likewise, the first enabler 918 may be used to disable the first channel 908 and prevent the first channel 908 from transmitting signals from the first panel 702 through the first channel 908. In this case, the field programmable gate arrays would not receive the signals and/or power from the first panel 702. Each of the other four enablers has similar capabilities with respect to their corresponding channels and panels.

As shown in FIG. 9, each of the channels and each of the enablers are connected to each of the field programmable gate arrays. Thus, for example, the first channel 908 and the first enabler 918 are connected to all of the first field programmable gate array 902, the second field programmable gate array 904, and the third field programmable gate array 906. Likewise, the second channel 910 and the second enabler 920 are connected to all three of the field programmable gate arrays. Similarly, the other three channels and the other three enablers are connected to all three of the field programmable gate arrays.

This multiplicity of connections allows each field programmable gate array to monitor each channel. The hybrid bus guardian 900 may then implement a voting scheme using the three field programmable gate arrays. Each field programmable gate array votes on whether data or power along a given channel is valid. If a majority of the field programmable gate arrays determine that data, power, or signals are invalid along a given channel, then the field programmable gate arrays are programmed to actuate a corresponding enabler to disable that channel. The corresponding panel is then isolated from the overall system, and at a later time maintenance may be performed on the panel to determine the source of the invalid data, signals, or power.

For example, the first field programmable gate array 902 and the second field programmable gate array 904 determine that data, signals, or power from the first panel 702 in FIG. 8 along the first channel 908 is invalid, though the third field programmable gate array 906 determines that they are valid. Because two of the three field programmable gate arrays determined that the data, signals, or power were invalid, the hybrid bus guardian 900 is configured such that first enabler 918 will be actuated to disable the first channel 908. Thus, the first panel 702 will be electrically isolated from the overall system.

In configurations using two hybrid bus guardians, such as hybrid bus guardian 900, both hybrid bus guardians would independently determine whether invalid data, signals, or power is received along a given channel. If one of the hybrid bus guardians determines that a given channel is valid, then that hybrid bus guardian will continue to network the associated panel even if the other hybrid bus guardian does not. Thus, even if one of the hybrid bus guardians does not operate as desired, the overall system will not experience any loss in performance.

Returning to an exemplary configuration of the hybrid bus guardian 900, each of the three field programmable gate arrays is connected by a communication backbone 928. In this manner, each of the first field programmable gate array 902, the second field programmable gate array 904, and the third field programmable gate array 906 may communicate with each other.

In addition, in some advantageous embodiments, each field programmable gate array may be assigned a corresponding identification. For example, the first field programmable gate array 902 may be assigned a first identification 930, the second field programmable gate array 904 may be assigned a second identification 932, and the third field programmable gate array 906 may be assigned a third identification 934. Any identification scheme might be used, although, in one advantageous embodiment, identifications such as "ID0", "ID1", and "ID2" might be used. These identifications for the field programmable gate arrays may be used in conjunction with a test port 936 for testing or certification of the hybrid bus guardian 900, as described further below.

In an advantageous embodiment, the test port 936 may be used to allow connection of a computer 938 to the hybrid bus guardian 900. The computer 938 may be a laptop, desktop, hand held device, or any other suitable process or computing system, such as those described elsewhere herein. The test port 936 may include a universal serial bus (USB) link to allow communication between the hybrid bus guardian 900 and the computer 938. The computer 938 may be connected to the hybrid bus guardian 900 at the test port 936 in order to capture real time information about the field programmable gate arrays, the channels, the enablers, and possibly also information regarding any data, signals, or power flowing within the overall system.

The computer 938 and the test port 936 may be used to perform testing and certification procedures with respect to various components of the hybrid bus guardian 900 without having to introduce a software certification element into the hybrid bus guardian 900. The computer 938 and the test port 936 also may be used to program any of the field programmable gate arrays.

In an advantageous embodiment, the field programmable gate array identifications may be implemented as particular pin strapping configurations. "Pin strapping" is a term used to describe either grounding certain pins on a connector to a line replaceable unit or grounding certain pins on a printed circuit board. These aspects are controlled by pulling up the signals on the inputs to logic by a pull up resistor so that if the pins are left ungrounded the input signal may float to a logical "one" state. If the pin is grounded, meaning connected to zero volts in the system, then the signal may be shorted to zero volts and thus be at a logical "zero" state.

The advantageous embodiments, with respect to the test port 936, may be implemented using pin strapping to a set of printed circuit board traces. A particular advantageous embodiment may be a strap_0:1 configuration. In this configuration, "00" or "ID0" may correspond to field programmable gate array_0 ("FPGA_0"), "01" or "ID1" may correspond to "FPGA_1", and "10" or "ID2" may correspond to "FPGA_2". In this manner, a logic circuit module may be programmed or designed such that the logic circuit is identical to other logic circuit modules but takes on an identification when the chip or line replaceable unit is deployed by connecting it to its target implementation.

Returning again to the description of the hybrid bus guardian 900, the various components shown in FIG. 9 may be powered by a power supply 940. In some advantageous embodiments, a backup power supply 942 may also be provided. In some advantageous embodiments, the backup power supply 942 may automatically provide power to the various components of the hybrid bus guardian 900 should the power supply 940 operate undesirably.

In summary, the advantageous embodiments provide for a multiply redundant and reliable networking system that networks groups of nodes. This feature may be implemented using the triple field programmable gate array arrangement of the hybrid bus guardian 900 shown in FIG. 9. Internal logic of the hybrid bus guardian 900 may be programmed to match the specific deterministic network traffic for the aircraft power panel systems such that the hybrid bus guardian 900 knows how to route data to specific output nodes.

In an advantageous embodiment, the network may be a time triggered protocol network, such as a TTP/c network. Because a TTP/c network operates in a time division multiplexed manner, specific bus packets can be routed to the correct power panel port via the four channels shown. The bus packets may be used to turn on or otherwise actuate the corresponding transceiver at the correct time via logic enable signals. In an advantageous embodiment, all normal aircraft certification standards, such as DO-160 for power and pin injection testing, as well as DO-254 for complex electronic hardware, may be used.

In an advantageous embodiment, TTP/c bus undesirable conditions may be detected, such as opens, shorts, or "babbling idiot" transmissions. Each field programmable gate array may then isolate the undesirable node from the bus. This function optionally may be programmed to retry at specific intervals to test for validity on a previously invalid channel or cause the channel to be isolated until a full power cycle occurs in the hybrid bus guardian line replaceable unit.

As described above, test and diagnostic features may be built into the hybrid bus guardian 900 to aid in more rapidly assessing wiring issues in aircraft production that have already proven to be difficult to diagnose with existing implementations. In an advantageous embodiment, status lights may be provided with the hybrid bus guardian 900 in order to provide for a visual status report for maintenance personnel. Such status lights may be, for example, multiple status lights, possibly one for each internal node in the line replaceable units. Additional lights may be provided in order to monitor, for example, channels, enablers, field programmable gate arrays, wiring, and other aspects of the hybrid bus guardian 900 or the overall system.

The hybrid bus guardian 900 and other components shown in FIG. 9 may overcome the problems faced by prior devices and methods and achieve the benefits described above. However, the illustration of the hybrid bus guardian 900 in FIG. 9 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 10:
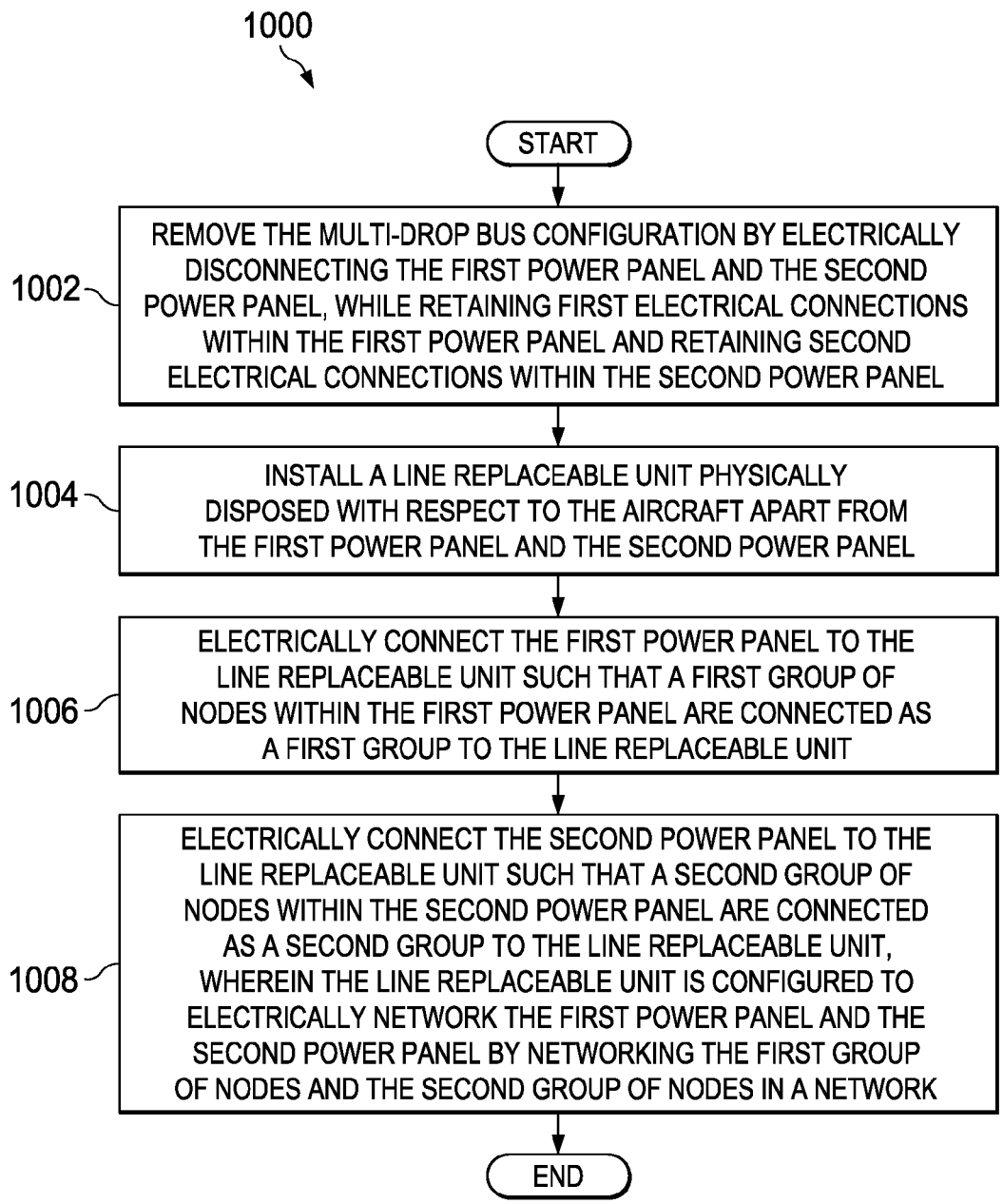
FIG. 10 is an illustration of a flowchart of a method for refitting an aircraft in accordance with an advantageous embodiment.

FIG. 10 is an illustration of a flowchart of a method for refitting an aircraft depicted in accordance with an advantageous embodiment. The term "refit" may be synonymous with the term "retrofit" and may include replacing parts, removing parts, and/or adding parts to a structure such as a vehicle. A process 1000 shown in FIG. 10 may be implemented with respect to a structure, such as the structure 400 of FIG. 4. The structure may be an aircraft, such as the aircraft 100 of FIG. 1, the aircraft 300 of FIG. 3, or the aircraft 634 of FIG. 6. The process 1000 may also be implemented as part of the aircraft manufacturing and service method 200 of FIG. 2. The various components described herein with respect to the process 1000 may be found and described with respect to FIG. 4, FIG. 5, FIG. 6, FIG. 7, FIG. 8, and FIG. 9. In an advantageous embodiment, the process 1000 is implemented with respect to an aircraft comprising a fuselage, a wing, a first power panel, and a second power panel, wherein the first power panel and the second power panel are electrically connected using a multi-drop bus configuration. The process 1000 may be implemented by human personnel, by automated machinery, or by combinations thereof.

The process 1000 begins by removing the multi-drop bus configuration by electrically disconnecting the first power panel and the second power panel, while retaining first electrical connections within the first power panel and retaining second electrical connections within the second power panel (operation 1002). The process 1000 installs a line replaceable unit physically disposed with respect to the aircraft apart from the first power panel and the second power panel (operation 1004).

The first power panel is electrically connected to the line replaceable unit such that a first group of nodes within the first power panel are connected as a first group to the line replaceable unit (operation 1006). The second power panel is electrically connected to the line replaceable unit such that a second group of nodes within the second power panel are connected as a second group to the line replaceable unit, wherein the line replaceable unit is configured to electrically network the first power panel and the second power panel by networking the first group of nodes and the second group of nodes in a network (operation 1008). The process 1000 terminates thereafter.

Figure 11:
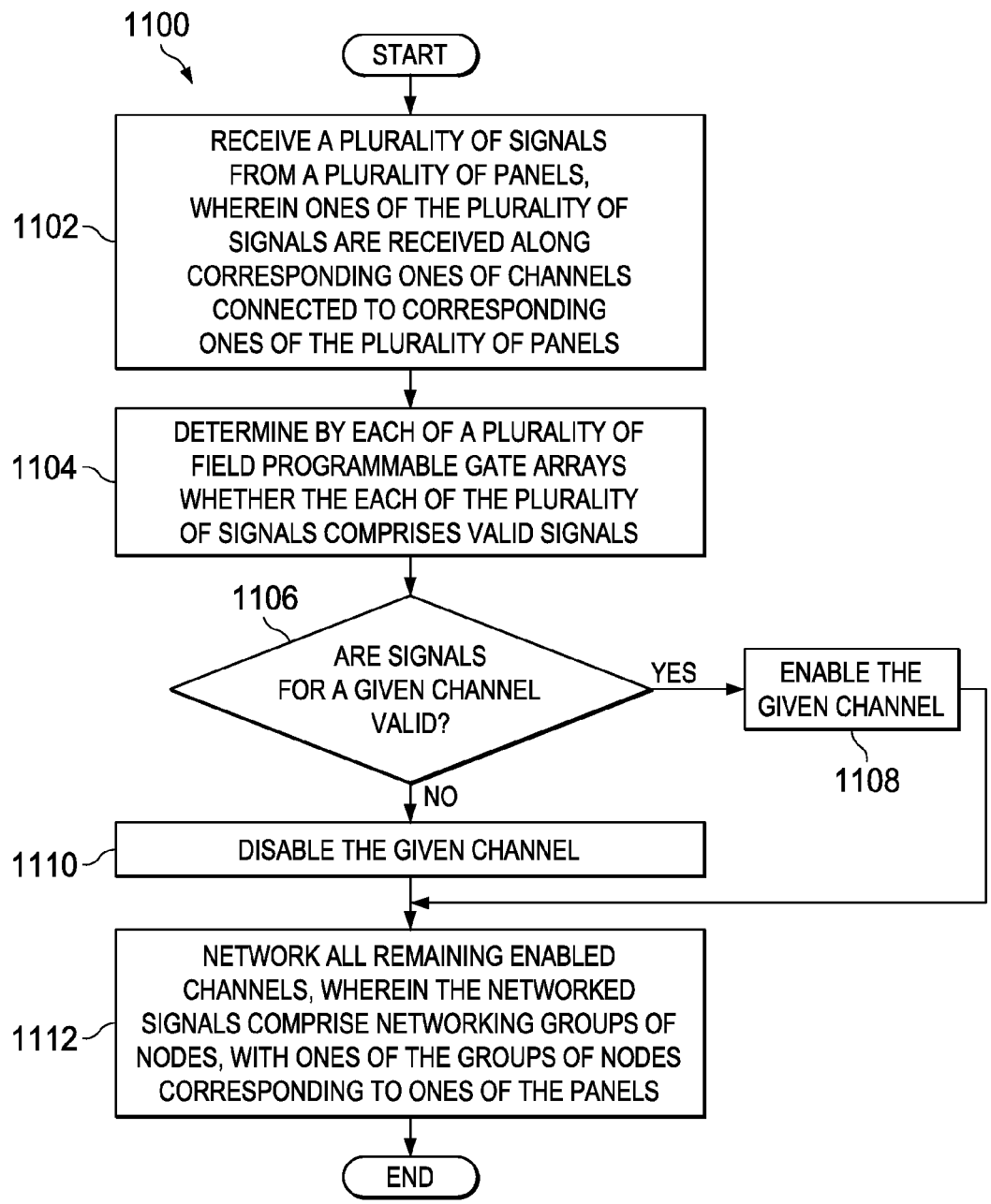
FIG. 11 is an illustration of a flowchart of a method for distributing power in a power distribution network in accordance with an advantageous embodiment.

FIG. 11 is an illustration of a flowchart of a method for distributing power in a power distribution network depicted in accordance with an advantageous embodiment. A process 1100 shown in FIG. 11 may be implemented in a hybrid bus guardian, such as the hybrid bus guardian 900 of FIG. 9, either of the first hybrid bus guardian 802 or the second hybrid bus guardian 804 in FIG. 8, the first bus guardian 422 or the second bus guardian 424 in FIG. 4, or the line replaceable unit 600 of FIG. 6. The process 1100 may be implemented using hardware, software, or a combination of hardware and software.

The process 1100 begins as a plurality of signals are received from a plurality of panels, wherein ones of the plurality of signals are received along corresponding ones of channels connected to corresponding ones of the plurality of panels (operation 1102). Each of a plurality of field programmable gate arrays determines whether the each of the plurality of signals comprises valid signals (operation 1104). A majority of field programmable gate arrays (FPGAs) determines whether signals for a given channel are valid (operation 1106). This determination may be made by components other than field programmable gate arrays or by software.

If the signals for a given channel are valid, a "yes" determination at operation 1106, then the given channel is enabled (operation 1108). However, if the signals for a given channel are invalid, a "no" determination at operation 1106, then the given channel is disabled (operation 1110).

In either case, the hybrid bus guardian networks all remaining enabled channels, wherein the networked signals comprise networking groups of nodes, wherein ones of the groups of nodes correspond to the ones of the panels (operation 1112). The process 1100 terminates thereafter.

FIG. 12 is an illustration of a block diagram of a data processing system in which an advantageous embodiment may be implemented. A data processing system 1200 in FIG. 12 is an example of a data processing system that may be used as the computer 938 in FIG. 9. The data processing system 1200 in FIG. 12 may also be a data processing system for implementing software implementations of the advantageous embodiments described elsewhere herein. In this illustrative example, the data processing system 1200 includes a communications fabric 1202, which provides communications between a processor unit 1204, a memory 1206, a persistent storage 1208, a communications unit 1210, an input/output (I/O) unit 1212, and a display 1214.

The processor unit 1204 serves to execute instructions for software that may be loaded into the memory 1206. The processor unit 1204 may be a number of processors, a multi-processor core, or some other type of processor, depending on the particular implementation. A number, as used herein with reference to an item, means one or more items. Further, the processor unit 1204 may be implemented using a number of heterogeneous processor systems in which a main processor is present with secondary processors on a single chip. As another illustrative example, the processor unit 1204 may be a symmetric multi-processor system containing multiple processors of the same type.

The memory 1206 and the persistent storage 1208 are examples of storage devices 1216. A storage device is any piece of hardware that is capable of storing information, such as, for example, without limitation, data, program code in functional form, and/or other suitable information, either on a temporary basis and/or a permanent basis. The storage devices 1216 may also be referred to as computer readable storage devices in these examples. The memory 1206, in these examples, may be, for example, a random access memory or any other suitable volatile or non-volatile storage device. The persistent storage 1208 may take various forms, depending on the particular implementation.

For example, the persistent storage 1208 may contain one or more components or devices. For example, the persistent storage 1208 may be a hard drive, a flash memory, a rewritable optical disk, a rewritable magnetic tape, or some combination of the above. The media used by the persistent storage 1208 also may be removable. For example, a removable hard drive may be used for the persistent storage 1208.

The communications unit 1210, in these examples, provides for communications with other data processing systems or devices. In these examples, the communications unit 1210 is a network interface card. The communications unit 1210 may provide communications through the use of either or both physical and wireless communications links.

The input/output unit 1212 allows for input and output of data with other devices that may be connected to the data processing system 1200. For example, the input/output unit 1212 may provide a connection for user input through a keyboard, a mouse, and/or some other suitable input device. Further, the input/output unit 1212 may send output to a printer. The display 1214 provides a mechanism to display information to a user.

Instructions for the operating system, applications, and/or programs may be located in the storage devices 1216, which are in communication with the processor unit 1204 through the communications fabric 1202. In these illustrative examples, the instructions are in a functional form on the persistent storage 1208. These instructions may be loaded into the memory 1206 for execution by the processor unit 1204. The processes of the different embodiments may be performed by the processor unit 1204 using computer implemented instructions, which may be located in a memory, such as the memory 1206.

These instructions are referred to as program code, computer usable program code, or computer readable program code that may be read and executed by a processor in the processor unit 1204. The program code in the different embodiments may be embodied on different physical or computer readable storage media, such as the memory 1206 or the persistent storage 1208.

A program code 1218 is located in a functional form on a computer readable media 1220 that is selectively removable and may be loaded onto or transferred to the data processing system 1200 for execution by the processor unit 1204. The program code 1218 and the computer readable media 1220 form a computer program product 1222 in these examples. In one example, the computer readable media 1220 may be a computer readable storage media 1224 or a computer readable signal media 1226. The computer readable storage media 1224 may include, for example, an optical or magnetic disk that is inserted or placed into a drive or other device that is part of the persistent storage 1208 for transfer onto a storage device, such as a hard drive, that is part of the persistent storage 1208. The computer readable storage media 1224 also may take the form of a persistent storage, such as a hard drive, a thumb drive, or a flash memory, that is connected to the data processing system 1200. In some instances, the computer readable storage media 1224 may not be removable from the data processing system 1200.

Alternatively, the program code 1218 may be transferred to the data processing system 1200 using the computer readable signal media 1226. The computer readable signal media 1226 may be, for example, a propagated data signal containing the program code 1218. For example, the computer readable signal media 1226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, the program code 1218 may be downloaded over a network to the persistent storage 1208 from another device or data processing system through the computer readable signal media 1226 for use within the data processing system 1200. For instance, program code stored in a computer readable storage medium in a server data processing system may be downloaded over a network from the server to the data processing system 1200. The data processing system providing the program code 1218 may be a server computer, a client computer, or some other device capable of storing and transmitting the program code 1218.

The different components illustrated for the data processing system 1200 are not meant to provide architectural limitations to the manner in which different embodiments may be implemented. The different advantageous embodiments may be implemented in a data processing system including components in addition to or in place of those illustrated for the data processing system 1200. Other components shown in FIG. 12 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, the processor unit 1204 may take the form of a hardware unit that has circuits that are manufactured or configured for a particular use. This type of hardware may perform operations without needing program code to be loaded into a memory from a storage device to be configured to perform the operations.

For example, when the processor unit 1204 takes the form of a hardware unit, the processor unit 1204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, the program code 1218 may be omitted, because the processes for the different embodiments are implemented in a hardware unit.

In still another illustrative example, the processor unit 1204 may be implemented using a combination of processors found in computers and hardware units. The processor unit 1204 may have a number of hardware units and a number of processors that are configured to run the program code 1218. With this depicted example, some of the processes may be implemented in the number of hardware units, while other processes may be implemented in the number of processors.

As another example, a storage device in the data processing system 1200 is any hardware apparatus that may store data. The memory 1206, the persistent storage 1208, and the computer readable media 1220 are examples of storage devices in a tangible form.

In another example, a bus system may be used to implement the communications fabric 1202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, the memory 1206, or a cache, such as found in an interface and memory controller hub that may be present in the communications fabric 1202.

The flowcharts and block diagrams in the different depicted embodiments illustrate the architecture, functionality, and operation of some possible implementations of apparatuses and methods in different advantageous embodiments. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the embodiments described herein provide for an apparatus including a structure and a first panel operably disposed with respect to the structure. A first plurality of nodes is disposed within the first panel, wherein the first plurality of nodes includes a first plurality of power distribution network nodes in a first power distribution network, and wherein the first plurality of nodes may further include a first group of nodes. A second panel is operably disposed with respect to the structure. A second plurality of nodes is disposed within the second panel, wherein the second plurality of nodes may include a second plurality of power distribution network nodes in a second power distribution network. The second plurality of nodes may further include a second group of nodes. The first power distribution network is electrically isolated from the second power distribution network. A bus is physically disposed with respect to the structure apart from the first panel and the second panel. The bus is electrically connected to the first panel and to the second panel. The bus is configured to network the first group of nodes and the second group of nodes in a network.

The advantageous embodiments also provide for a method for refitting an aircraft comprising a fuselage, a wing, a first power panel, and a second power panel, wherein the first power panel and the second power panel are electrically connected using a multi-drop bus configuration. The method includes removing the multi-drop bus configuration by electrically disconnecting the first power panel and the second power panel, while retaining first electrical connections within the first power panel and retaining second electrical connections within the second power panel. A line replaceable unit physically disposed with respect to the aircraft is installed apart from the first power panel and the second power panel. The first power panel is electrically connected to the line replaceable unit such that a first group of nodes within the first power panel is connected as a first group to the line replaceable unit. The second power panel is electrically connected to the line replaceable unit such that a second group of nodes within the second power panel is connected as a second group to the line replaceable unit. The line replaceable unit is configured to electrically network the first power panel and the second power panel by networking the first group of nodes and the second group of nodes in a network.

The advantageous embodiments also provide for an apparatus including a line replaceable unit configured to network received signals from a plurality of groups of nodes. The received signals from the plurality of groups of nodes are networked as groups. The line replaceable unit is further configured to isolate a particular group of nodes responsive to detecting an invalid condition with respect to the particular group of nodes.

The advantageous embodiments also provide for a first branch of wiring connecting the bus guardian to the first panel having a first length that is about one third of a second length of wiring that would be used had the first panel and the second panel been connected by a multi-drop network. The advantageous embodiments also provide for a first total wiring length for the network that is about ten times less than a second total wiring length that would have been used had the first plurality of nodes and the second plurality of nodes been connected by a star network.

The different advantageous embodiments can take the form of an entirely hardware embodiment, an entirely software embodiment, or an embodiment containing both hardware and software elements. Some advantageous embodiments are implemented in software, which includes, but is not limited to forms, such as, for example, firmware, resident software, and microcode.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

As used herein, the terms "associated" or "disposed with respect to" means to be connected to or influenced by. For example, a first component may be considered to be associated with a second component by being secured to the second component, bonded to the second component, fastened to the second component, electrically connected to the second component, experience a weak interaction in response to an event at the first component, and/or connected to or influenced by the second component in some other suitable manner. The first component also may be connected to the second component using an intermediary third component. The first component may also be considered to be associated with the second component by being formed as part of and/or an extension of the second component.

Furthermore, the different advantageous embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output, or I/O devices, can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters, although these two components are just a few of the currently available types of communications adapters.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the advantageous embodiments, the practical application, and to enable others of ordinary skill in the art to understand the disclosure for various embodiments with various modifications as are suited to the particular use contemplated.

What is claimed is:

1. An apparatus configured to network a first group of nodes with a second group of nodes, the apparatus comprising:
   a structure;
   a first panel operably disposed with respect to the structure;
   the first plurality of nodes disposed within the first panel, wherein the first plurality of nodes comprises a first plurality of power distribution network nodes in a first power distribution network, and wherein the first plurality of nodes further comprises a first group of nodes;
   a second panel operably disposed with respect to the structure;
   the second plurality of nodes disposed within the second panel, wherein the second plurality of nodes comprises a second plurality of power distribution network nodes in a second power distribution network, wherein the second plurality of nodes further comprises a second group of nodes, and wherein the first power distribution network is electrically isolated from the second power distribution network; and
   a bus guardian physically disposed with respect to the structure apart from the first panel and the second panel, wherein the bus guardian is electrically connected to the first panel and to the second panel, and wherein the bus guardian is configured to network the first group of nodes and the second group of nodes in a network.

2. The apparatus of claim 1, wherein the structure comprises an aircraft comprising a fuselage and a wing connected to the fuselage, and wherein the bus guardian, first panel, and second panel are disposed in the fuselage.

3. The apparatus of claim 1, wherein the bus guardian is configured to, in an event the first panel does not operate as desired, continue to network power or data among remaining components in the structure so that power can be maintained to the remaining components.

4. The apparatus of claim 3 further comprising a second bus guardian disposed with respect to the structure, wherein the second bus guardian is electrically connected to the first panel and to the second panel, wherein the second bus guardian is electrically isolated from the bus guardian, and wherein the second bus guardian is configured to network the first group of nodes and the second group of nodes in a second network.

5. The apparatus of claim 1, wherein the first plurality of power distribution network nodes are connected by a second bus guardian operatively disposed with respect to the first panel, and wherein the first plurality of power distribution network nodes are connected in a multi-drop configuration.

6. The apparatus of claim 5, wherein the second plurality of power distribution network nodes are connected by a bus operatively disposed with respect to the second panel, and wherein the second plurality of power distribution network nodes are connected in a second multi-drop configuration.

7. The apparatus of claim 1, wherein the bus guardian is further configured to electrically isolate one of the first panel and the second panel in the event of an interruption in service in the one of the first panel and the second panel.

8. The apparatus of claim 1, wherein the bus guardian comprises:
   a first channel electrically connected to the first panel;
   a second channel electrically connected to the second panel; and
   a plurality of field programmable gate arrays electrically connected by a communication backbone, wherein the plurality of field programmable gate arrays is further electrically connected to both the first channel and the second channel.

9. The apparatus of claim 8, wherein the bus guardian comprises a plurality of additional channels and wherein the plurality of field programmable gate arrays comprises first, second, and third field programmable gate arrays configured in such a manner that the bus guardian is capable of shutting down any given channel responsive to invalid data being detected in the any given channel.

10. The apparatus of claim 9, wherein the plurality of field programmable gate arrays are electrically connected to both a first power source and also to a backup power source configured to provide power to the plurality of field programmable gate arrays if the first power source does not operate as desired.

* * * * *